United States Patent
Im et al.

(10) Patent No.: US 9,164,579 B2
(45) Date of Patent: Oct. 20, 2015

(54) ELECTRONIC DEVICE FOR GRANTING AUTHORITY BASED ON CONTEXT AWARENESS INFORMATION

(75) Inventors: Soungmin Im, Seoul (KR); Sunjin Yu, Seoul (KR); Taehyeong Kim, Seoul (KR); Hyunsook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/296,767

(22) Filed: Nov. 15, 2011

(65) Prior Publication Data

US 2013/0120249 A1 May 16, 2013

(51) Int. Cl.
- G06F 3/033 (2013.01)
- G06F 3/01 (2006.01)
- G06F 3/03 (2006.01)

(52) U.S. Cl.
CPC .............. *G06F 3/011* (2013.01); *G06F 3/017* (2013.01); *G06F 3/0304* (2013.01); *G06F 2203/0381* (2013.01); *G06F 2203/0382* (2013.01)

(58) Field of Classification Search
None
See application file for complete search history.

(56) References Cited

U.S. PATENT DOCUMENTS

| | | | | |
|---|---|---|---|---|
| 6,204,837 | B1* | 3/2001 | Smith | 345/157 |
| 2002/0059308 | A1* | 5/2002 | Kawashima et al. | 707/200 |
| 2006/0154725 | A1* | 7/2006 | Glaser et al. | 463/37 |
| 2007/0279485 | A1* | 12/2007 | Ohba et al. | 348/41 |
| 2007/0288640 | A1* | 12/2007 | Schmieder | 709/227 |
| 2008/0244467 | A1* | 10/2008 | Kim et al. | 715/863 |
| 2009/0138805 | A1* | 5/2009 | Hildreth | 715/745 |
| 2009/0208052 | A1* | 8/2009 | Kaplan | 382/103 |
| 2010/0144436 | A1* | 6/2010 | Marks et al. | 463/36 |
| 2010/0253621 | A1* | 10/2010 | Suzuki et al. | 345/157 |
| 2010/0281437 | A1* | 11/2010 | Stone-Perez et al. | 715/863 |
| 2010/0295785 | A1* | 11/2010 | Lu et al. | 345/159 |
| 2010/0304858 | A1* | 12/2010 | Asuke et al. | 463/31 |
| 2011/0057875 | A1* | 3/2011 | Shigeta et al. | 345/156 |
| 2011/0074667 | A1* | 3/2011 | Robinson | 345/156 |
| 2011/0190055 | A1* | 8/2011 | Leyvand et al. | 463/36 |
| 2011/0227826 | A1* | 9/2011 | Yamamoto | 345/158 |
| 2011/0231791 | A1* | 9/2011 | Itahana | 715/799 |
| 2011/0237324 | A1* | 9/2011 | Clavin et al. | 463/29 |
| 2011/0254764 | A1* | 10/2011 | Kimoto et al. | 345/157 |
| 2012/0299827 | A1* | 11/2012 | Osborn et al. | 345/158 |
| 2012/0323364 | A1* | 12/2012 | Birkenbach et al. | 700/257 |
| 2013/0106757 | A1* | 5/2013 | Hablinski et al. | 345/173 |

FOREIGN PATENT DOCUMENTS

| | | | | |
|---|---|---|---|---|
| WO | WO 2011085815 A1 * | 7/2011 | | |
| WO | WO 2012008960 A1 * | 1/2012 | | |
| WO | WO2012008960 A1 * | 1/2012 | ............... | G06F 3/01 |

* cited by examiner

*Primary Examiner* — Seokyun Moon
*Assistant Examiner* — Josemarie G Acha, III
(74) *Attorney, Agent, or Firm* — Birch, Stewart, Kolasch & Birch, LLP

(57) ABSTRACT

Provided are an electronic device. The electronic device includes at least one sensing unit recognizing a plurality of pointing means, a display unit displaying a pointer following a movement of a pointing means having the authority to control the electronic device among the plurality of pointing means, and a controller obtaining context awareness information related to the electronic device, determining the number of pointers required for controlling the electronic device according to the context awareness information, and selecting at least one point means having the authority to control the electronic device from among the plurality of pointing means based on the number of required points.

16 Claims, 24 Drawing Sheets

FIG. 5
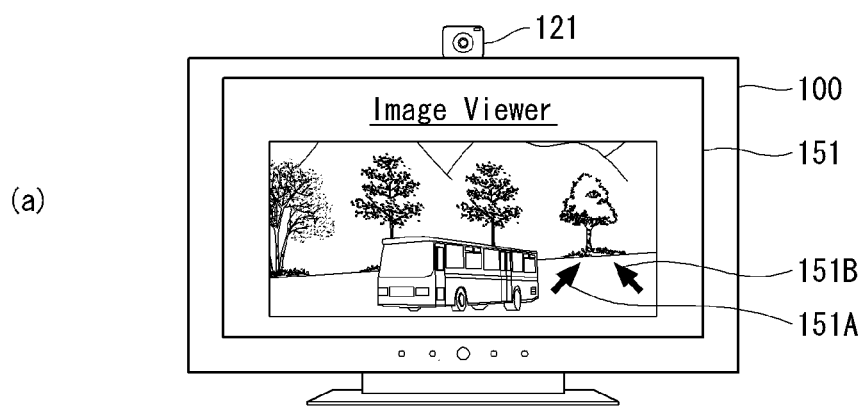
(a)
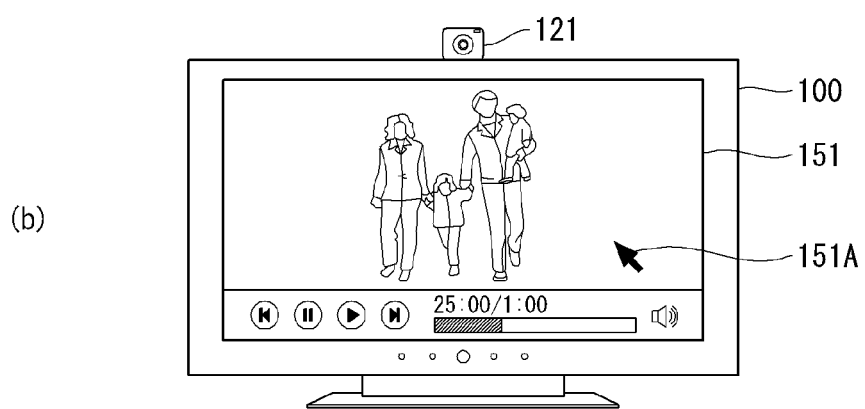
(b)

FIG. 12
   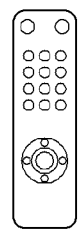 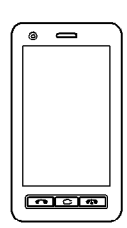
(d)　　　(b)　　　(c)　　　(d)　　　(e)

FIG. 21
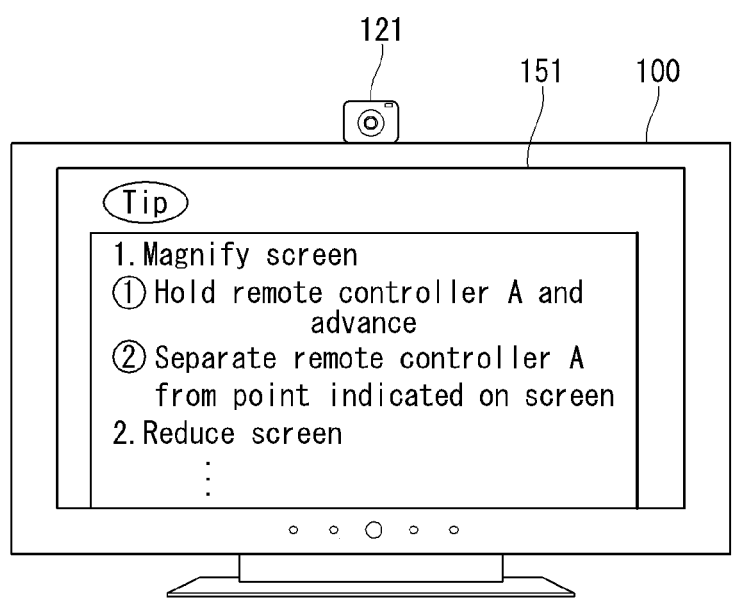
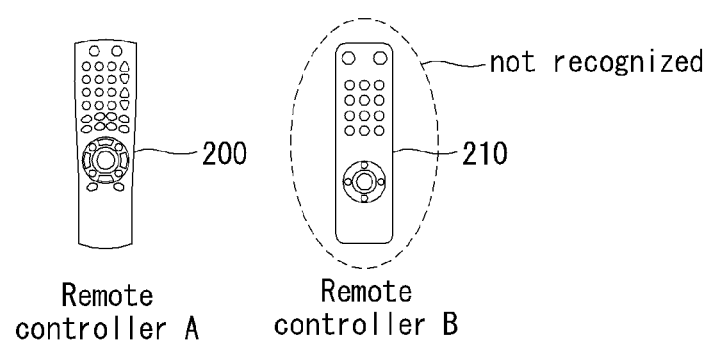

ELECTRONIC DEVICE FOR GRANTING AUTHORITY BASED ON CONTEXT AWARENESS INFORMATION

BACKGROUND

1. Field

The present invention relates to an electronic device capable of performing a control function by using a pointer displayed on a screen and, more particularly, to an electronic device capable of granting or maintaining, and depriving the authority to control the electronic device of a plurality of pointing units according to the number of points required for controlling the electronic device determined based on obtained context awareness information.

2. Related Art

As the functions of electronic devices such as personal computers, notebook computers, mobile phones, or the like, are diversified, electronic devices are implemented in the form or a multimedia player or device supporting complicated functions such as capturing images or video, reproducing music or video files, playing games, receiving broadcast signals, and the like.

Electronic devices may be divided into a mobile electronic device and a stationary electronic device according to whether the electronic device is portable or not. The stationary electronic device may be, for example, a television, a monitor for a desktop computer, or the like. Recently, an interest in a technique of using a pointer displayed on a display unit to control such mobile and stationary electronic devices is increasing.

SUMMARY

It is, therefore, an object of the present invention to provide an electronic device capable of determining the number of pointers required for controlling the electronic device according to context awareness information, and granting the authority to control the electronic device to a plurality of pointing means, maintaining of the authority to control the electronic device of the plurality of pointing means, and depriving the plurality of pointing means of the authority to control the electronic device, according to the determined number of pointers.

Technical subjects of the present invention are not limited to the foregoing technical subjects and any other technical subjects not mentioned will be clearly understood by a skilled person in the art to which the present invention pertains from the following description.

In order to achieve the object, there is provided an electronic device including: at least one sensing unit recognizing a plurality of pointing means; a display unit displaying a pointer following a movement of a pointing means having the authority to control the electronic device among the plurality of pointing means; and a controller obtaining context awareness information related to the electronic device, determining the number of pointers required for controlling the electronic device according to the context awareness information, and selecting at least one point means having the authority to control the electronic device from among the plurality of pointing means based on the number of required points.

In order to achieve the object, there is also provided an electronic device including: at least one sensing unit recognizing a plurality of pointing means; a display unit displaying a pointer following a movement of a pointing means having the authority to control the electronic device among the pointing means; and a controller obtaining context awareness information related to the electronic device, determining the number of pointers required for controlling the electronic device according to the context awareness information, and selecting at least one point means having the authority to control the electronic device from among the plurality of pointing means based on a predetermined rule when the number of the plurality of pointing means is greater than the number of required pointers.

In order to achieve the object, there is also provided an electronic device including: at least one sensing unit recognizing pointing means; a display unit displaying a pointer following a movement of a pointing means having the authority to control the electronic device among the pointing means; and a controller obtaining context awareness information related to the electronic device, determining the number of pointers required for controlling the electronic device according to the context awareness information, and performing a user interfacing operation indicating that an addition pointing means having the authority to control the electronic device is required when the n umber of the recognized pointing means is smaller than the number of required pointers.

In order to achieve the object, there is also provided an electronic device including: at least one sensing unit recognizing pointing means; a display unit displaying a pointer following a movement of a pointing means having the authority to control the electronic device among the pointing means; and a controller obtaining context awareness information related to the electronic device and displaying a pointer corresponding to a first pointing means assigned to a first user and a pointer corresponding to a second pointing means assigned to a second user such that the pointers are discriminated from each other.

In the electronic device according to embodiments of the present invention, the number of pointers required for controlling the electronic device is determined according to obtained context awareness information, and the authority to control the electronic device is granted to a plurality of pointing means, maintained, or deprived.

Also, since pointers corresponding to pointing means assigned to a plurality of users are differently displayed according to obtained context awareness information to allow users to recognize them by intuition, thereby improving user convenience with controlling of the electronic device and increasing the speed of user's manipulating the electronic device.

BRIEF DESCRIPTION OF THE DRAWINGS

The above and other objects and features of the present invention will become apparent from the following description of preferred embodiments given in conjunction with the accompanying drawings, in which:

FIG. 5 is a view showing examples of determining the number of pointers required for controlling the electronic device based a type of content output from the electronic device according to an embodiment of the present invention.

FIG. 12 is a view showing that the types of pointers displayed on a display unit of the electronic device can be different according to the types of pointing means in the electronic device according to an embodiment of the present invention.

FIG. 21 is a view showing that an image message is displayed on the display unit in order to inform the user about a substitute control method with respect to the method for controlling the electronic device using an unrecognized pointing means by using the currently recognized pointing means according to the method for driving the electronic device illustrated in FIG. 19.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, an electronic device relating to the present invention will be described below in more detail with reference to the accompanying drawings. In the following description, suffixes "module" and "unit" are given to components of the electronic device in consideration of only facilitation of description and do not have meanings or functions discriminated from each other.

The electronic device described in the specification can include a cellular phone, a smart phone, a laptop computer, a digital broadcasting terminal, personal digital assistants (PDA), a portable multimedia player (PMP), a navigation system and so on.

Figure 1:
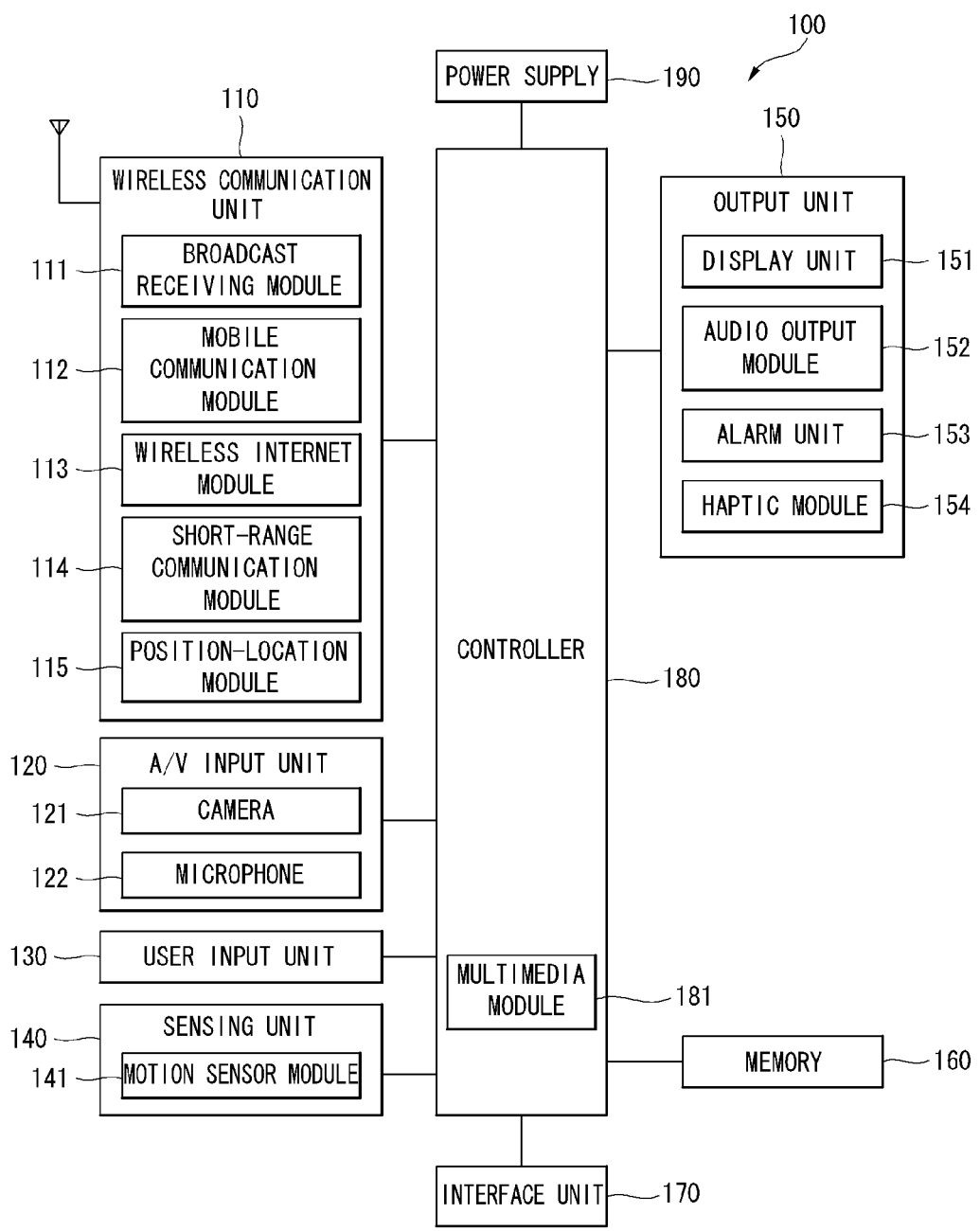
FIG. 1 is a block diagram of an electronic device related to an embodiment of the present invention.

FIG. 1 is a block diagram of an implementation of an electronic device 100. The electronic device 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the electronic device can be varied.

The components of the electronic device will now be described.

The radio communication unit 110 can include at least one module that enables radio communication between the electronic device 100 and a radio communication system or between the electronic device 100 and a network in which the electronic device 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the electronic device. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The electronic device 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm module 153 and a haptic module 154.

The display unit 151 displays information processed by the electronic device 100. For example, the display unit 151 displays UI or graphic user interface (GUI) related to a telephone call when the electronic device is in the call mode. The display unit 151 displays a captured or/and received image, UI or GUI when the electronic device 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the electronic device 100 through an area of the body of the electronic device 100, which is occupied by the display unit 151.

The electronic device 100 can include at least two display units 151 according to constitution of the terminal. For example, the electronic device 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the electronic device, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the electronic device 100. The audio output module 152 can include a receiver, a speaker, a buzzer, etc.

The alarm module 153 outputs a signal for indicating generation of an event of the electronic device 100. Examples of events generated in the electronic device include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to constitution of the electronic device.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the electronic device 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the electronic device 100 through a card slot included in the interface 170.

The configuration of the electronic device 100 according to an embodiment of the present invention has been described with reference to FIG. 1. Hereinafter, a method for driving the electronic device 100 using pointing means implemented in the electronic device 100 according to an embodiment of the present invention will be described in detail with reference to FIGS. 2 to 24.

Figure 2:
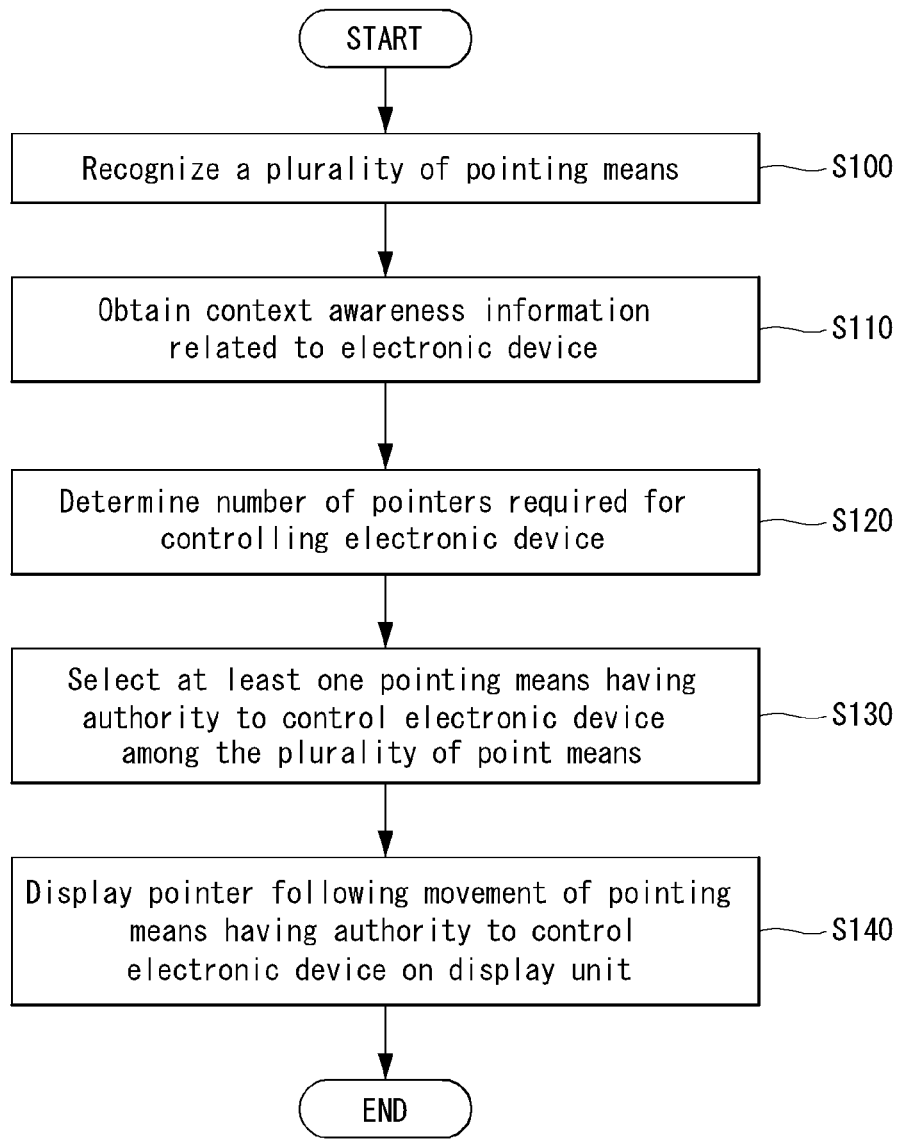
FIG. 2 is a flow chart illustrating the process of an example of a method for driving an electronic device according to an embodiment of the present invention.

FIG. 2 is a flow chart illustrating the process of an example of a method for driving an electronic device according to an embodiment of the present invention. The driving method will be described with reference to required drawings.

First, the electronic device 100 recognizes a plurality of pointing means by using at least one sensing unit (S100). When the authority to control the electronic device 100 is granted to a particular recognized pointing means, the controller 180 of the electronic device 100 may display a pointer which follows a movement of the particular pointing means and can be used for controlling the electronic device 100, on the display unit 151.

The pointing means with respect to the electronic device 100 may include a remote controller of the electronic device 100, a mobile terminal including an application for controlling the electronic device 100, a mouse, a predetermined particular body part of the user, and the like. However, the scope of the present invention is not limited thereto.

The sensing unit may include a wired/wireless communication module for receiving a signal transmitted from the remote controller, the mobile terminal, or the like, a wired/wireless communication module for receiving a signal transmitted from the mouse, a camera for capturing an image of a motion of the particular body part of the user, and the like. However, the sensing unit with respect to the electronic device 100 according to an embodiment of the present invention is not limited to the foregoing examples.

In the state in which the plurality of pointing means are recognized, the controller 180 obtains context awareness information related to the electronic device 100 (S110), and determines the number of pointers required for controlling the electronic device 100 based on the obtained context awareness information (S120).

Here, the context awareness information may include information regarding a function executed in the electronic device 100, information regarding a system situation of the electronic device 100, information regarding a relationship between the electronic device 100 and a different electronic device, information regarding an interaction between the electronic device 100 and the user.

For example, among the context awareness information, the information related to the function related to the function being executed in the electronic device 100 may include information regarding an operational state of an application being executed in the electronic device 100, information regarding content being output from the electronic device 100, or the like. The information regarding the interaction between the electronic device 100 and the user may include information regarding a present condition of the user of the electronic device 100, information regarding a control manipulation of the electronic device 100 by the user, and the like.

When the number of pointers required for controlling the electronic device 100 is determined, the controller 180 selects at least one pointing means having the authority to control the electronic device 100 from among the plurality of recognized pointing means (S130). Here, a reference for the controller 180 to select the pointing means having the authority to control the electronic device 100 from among the plurality of pointing means may be determined according to predetermined priority levels or according to order in which the pointing means are recognized.

Thereafter, the controller 180 displays a pointer that follows the movement of the pointing means having the authority to control the electronic device 100 on the display unit (S140). Then, the user may perform various control functions through the pointer by using the pointing means.

Hereinafter, examples of determining the number of pointers required for controlling the electronic device 100 will be described in detail with reference to FIGS. 3 to 5.

Figure 3:
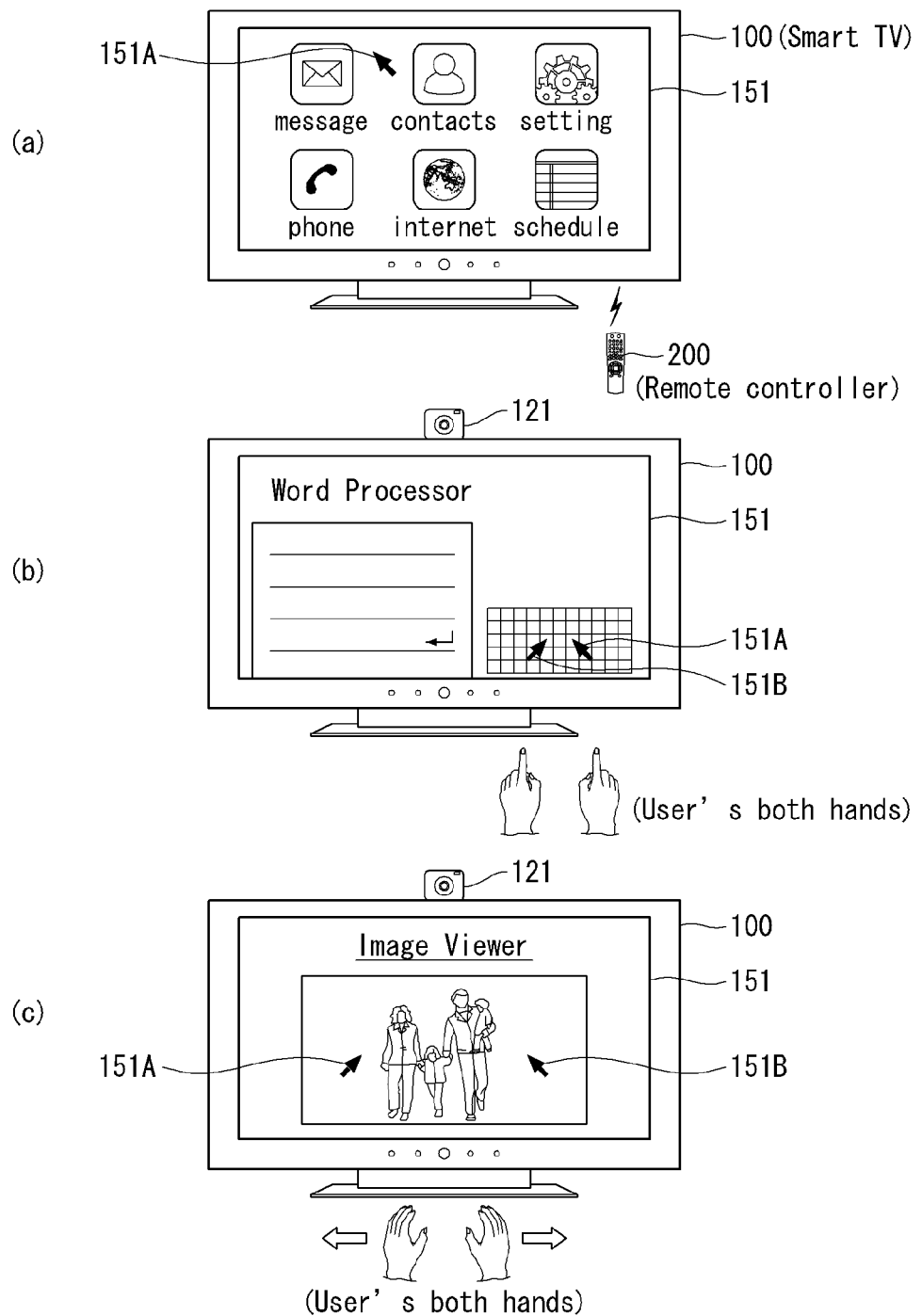
FIG. 3 is a view showing examples of determining the number of pointers required for controlling the electronic device according to a type of an application being executed in the electronic device according to an embodiment of the present invention.

FIG. 3 is a view showing examples of determining the number of pointers required for controlling the electronic device 100 according to a type of an application being executed in the electronic device according to an embodiment of the present invention.

In FIG. 3(a), when an application executed in the electronic device 100 is a driving application of the electronic device 100 basically mounted in the electronic device 100, the controller 180 may determine that the number of pointers required for controlling the electronic device 10 is 1. Namely, in FIG. 3(a), the authority for control the electronic device 100 is granted to a remote controller 200 of the electronic device 100, and the user may control the electronic device 100 by using a pointer 151A corresponding to the remote controller 200 displayed on the display unit 151 of the electronic device 100.

In FIG. 3(b), when an application executed in the electronic device 100 is a word processor application, the controller 180 may determine that the number of pointers required for controlling the electronic device 10 is 2. Namely, in FIG. 3(b), the authority to control the electronic device 100 is granted to both of user's hands, pointers 151A and 151B corresponding to the both of user's hands are displayed on the display unit 151, and the user may perform word processing by selecting keys of a virtual keyboard displayed on the display unit 151 with both of his hands.

In FIG. 3(c), when an application executed in the electronic device 100 is an image view application, the controller 180 may determine that the number of pointers required for controlling the electronic device 100 is 2. Namely, in FIG. 3(c), the authority to control the electronic device 100 is granted to both of user's hands, pointers 151A and 151B corresponding to both of user's hands are displayed on the display unit 151, and the user may magnify or reduce an opened image or edit it with both of his hands.

Figure 4:
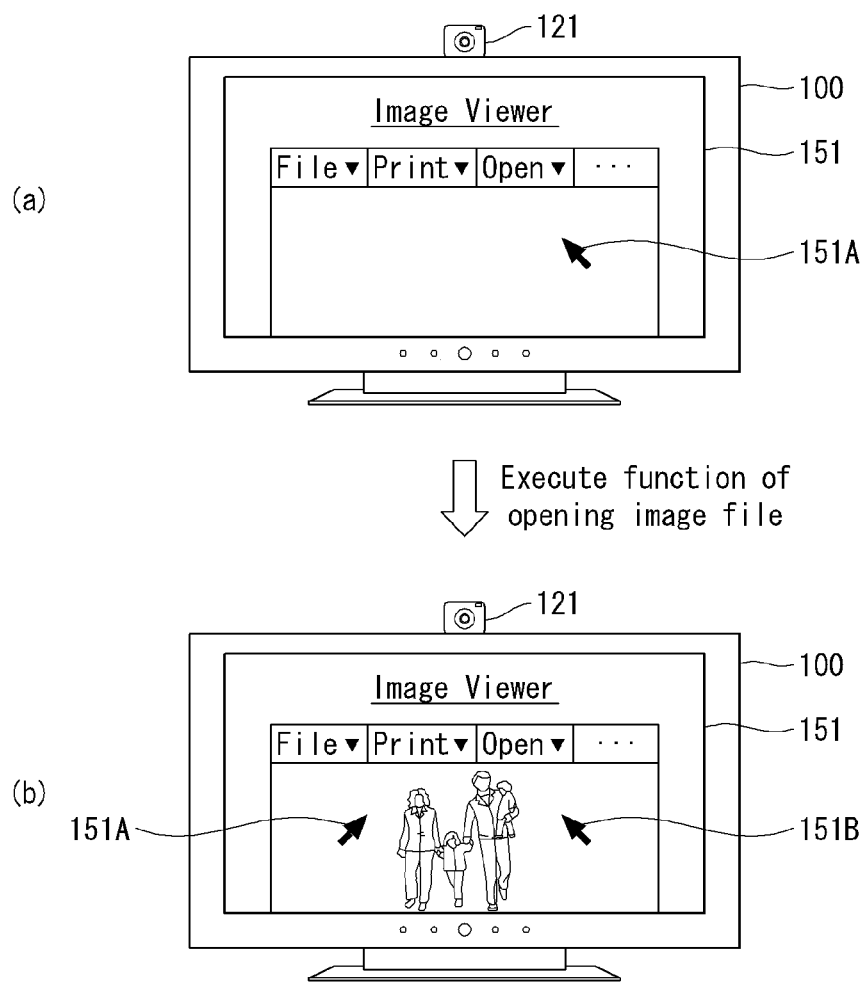
FIG. 4 is a view showing examples of determining the number of pointers required for controlling the electronic device according to a type of a function of an application being executed in the electronic device according to an embodiment of the present invention.

FIG. 4 is a view showing examples of determining the number of pointers required for controlling the electronic device 100 according to a type of a function of an application being executed in the electronic device according to an embodiment of the present invention.

With reference to FIG. 4(a), it is noted that, before a particular image file is open in a state in which an image view application is executed on the electronic device 100, the number of pointers required for controlling the electronic device 100 is 1 and only one pointer 151A is displayed on the display unit 151 of the electronic device 100.

However, with reference to FIG. 4(b) in which a particular image file is open in the image view application, it is noted the number of pointers required for controlling the electronic device 100 is 2 and two pointers 151A and 151B are displayed on the display unit 151.

These examples can be similarly applicable to a case in which the number of pointers required for controlling the electronic device 100 before or after opening a document file in a word processor application being executed is required to be increased.

Conversely, even in case in which an application being executed in the electronic device 100 is an application that requires a plurality of pointers, when an environment configuration function of the application being executed is executed, the number of the pointers required for controlling the electronic device 100 may be reduced. The reason is because, in case of configuring an environment of the electronic device 100, although only one pointer is used, it is highly likely that there is not much inconvenience in establishing a user environment.

FIG. 5 is a view showing examples of determining the number of pointers required for controlling the electronic device 100 based a type of content output from the electronic device 100 according to an embodiment of the present invention.

FIG. 5(a) illustrates that when content output on the electronic device 100 is a still image, the controller 180 of the electronic device 100 determines that the number of pointers required for controlling the electronic device 100 is 2. Then, two pointers 151A and 151B are displayed on the display unit 151 of the electronic device 100, and the user may perform a function of magnifying, reducing, editing the still image by using the two pointers 151A and 151B. Here, the two pointers 151A and 151B are displayed to follow both of the user's hands granted the authority to control the electronic device 100. Namely, the electronic device 100 may recognize a user's gesture and control the operation of the electronic device 100 based on the recognized user's gesture.

FIG. 5(b) illustrates that when content output on the electronic device 100 is a video, the controller 180 of the electronic device 100 determines that the number of pointers required for controlling the electronic device 100 is 1. Then, one pointer 151A is displayed on the display unit 151, and the user may reproduce and stop the video or adjust a sound volume by using the one pointer 151A. Here, the one pointer 151A may be displayed to follow a movement of the remote controller granted the authority to control the electronic device 100.

Figure 6:
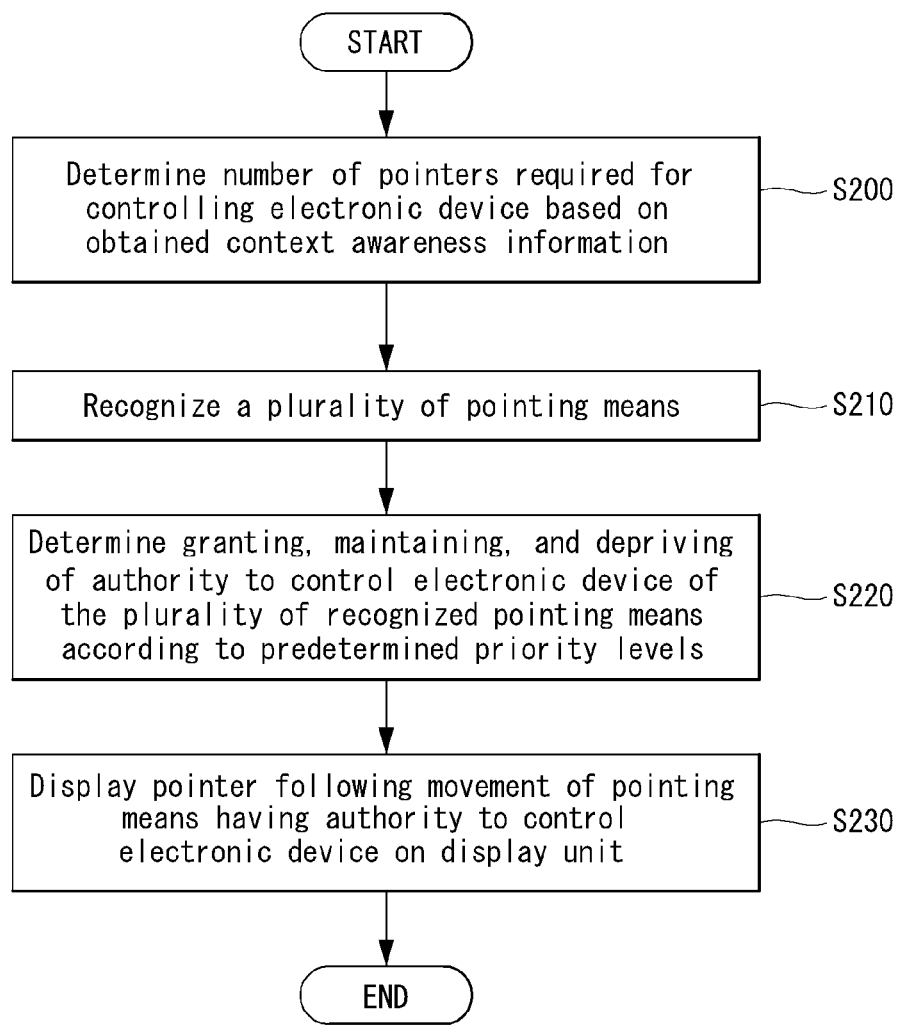
FIG. 6 is a flow chart illustrating the process of another example of a method for driving the electronic device according to an embodiment of the present invention.

FIG. 6 is a flow chart illustrating the process of another example of a method for driving the electronic device according to an embodiment of the present invention. The driving method will be described with reference to required drawings.

The controller 180 of the electronic device 100 obtains context awareness information related to the electronic device 100, and determines the number of pointers required for controlling the electronic device 100 based on the obtained context awareness information (S200). And then, the electronic device 100 recognizes a plurality of pointing means that can be used for controlling the electronic device 100 by using at least one sensing unit (S210).

Thereafter, the controller 180 determines whether to grant the authority to control the electronic device 100 to the plurality of recognized pointing means, whether to maintain the authority to control the electronic device 100 by the plurality of recognized pointing means, and whether to deprive the plurality of recognized pointing means of the authority to control the electronic device 100 according to predetermined priority levels (S220). For example, the controller 180 may grant the authority to control the electronic device 100 to pointing means by a required number of pointers, among the plurality of pointing means, and deprive the other remaining pointing members of the authority to control the electronic device 100, according to predetermined priority levels.

Subsequently, the controller 180 displays a pointer that follows a movement of the pointing means having the authority to control the by a required number of pointers on the display unit 151 of the by a required number of pointers (S230). Then, the user can control the by a required number of pointers by using the pointer.

Figure 7:
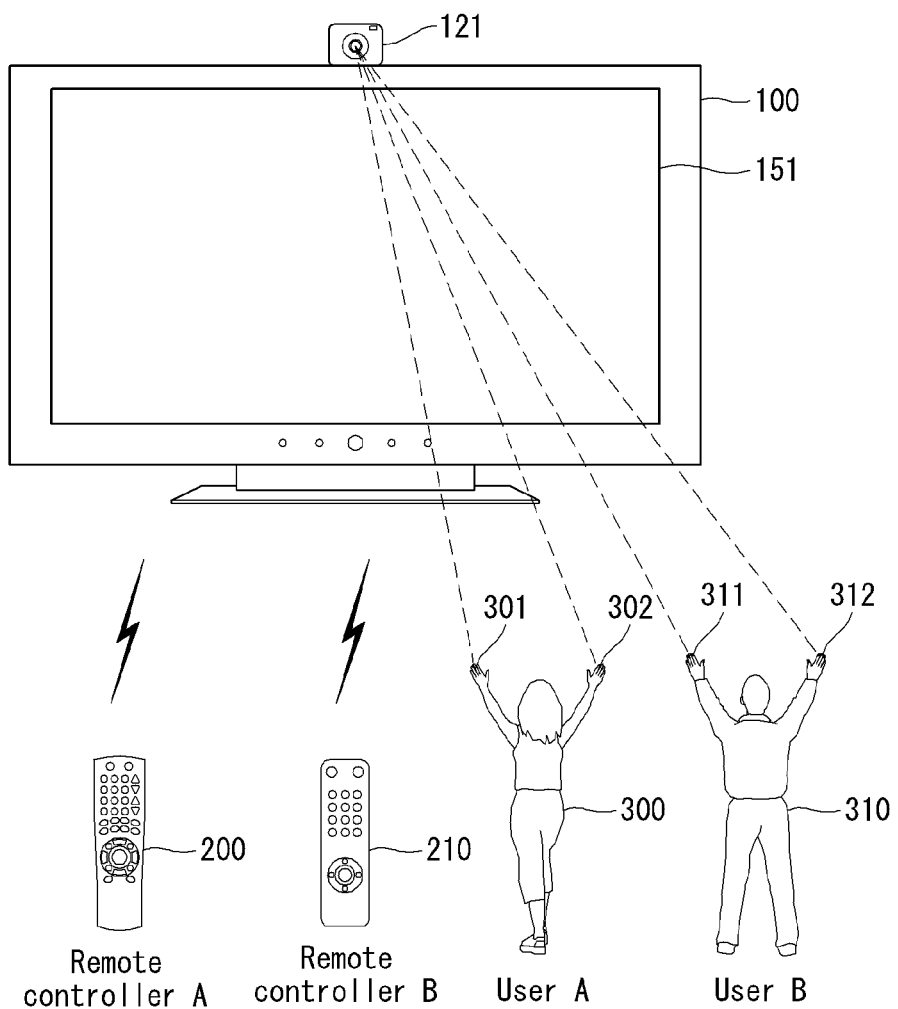
FIG. 7 is a view showing an example of determining granting the authority to control the electronic device to a plurality of pointing means, maintaining the authority to control the electronic device by the plurality of pointing means, and depriving the plurality of pointing means of the authority to control the electronic device according to the method for driving the electronic device illustrated in FIG. 6.

FIG. 7 is a view showing an example of determining granting the authority to control the electronic device 100 to a plurality of pointing means, maintaining the authority to control the electronic device 100 by the plurality of pointing means, and depriving the plurality of pointing means of the authority to control the electronic device according to the method for driving the electronic device 100 illustrated in FIG. 6.

Figure 8:
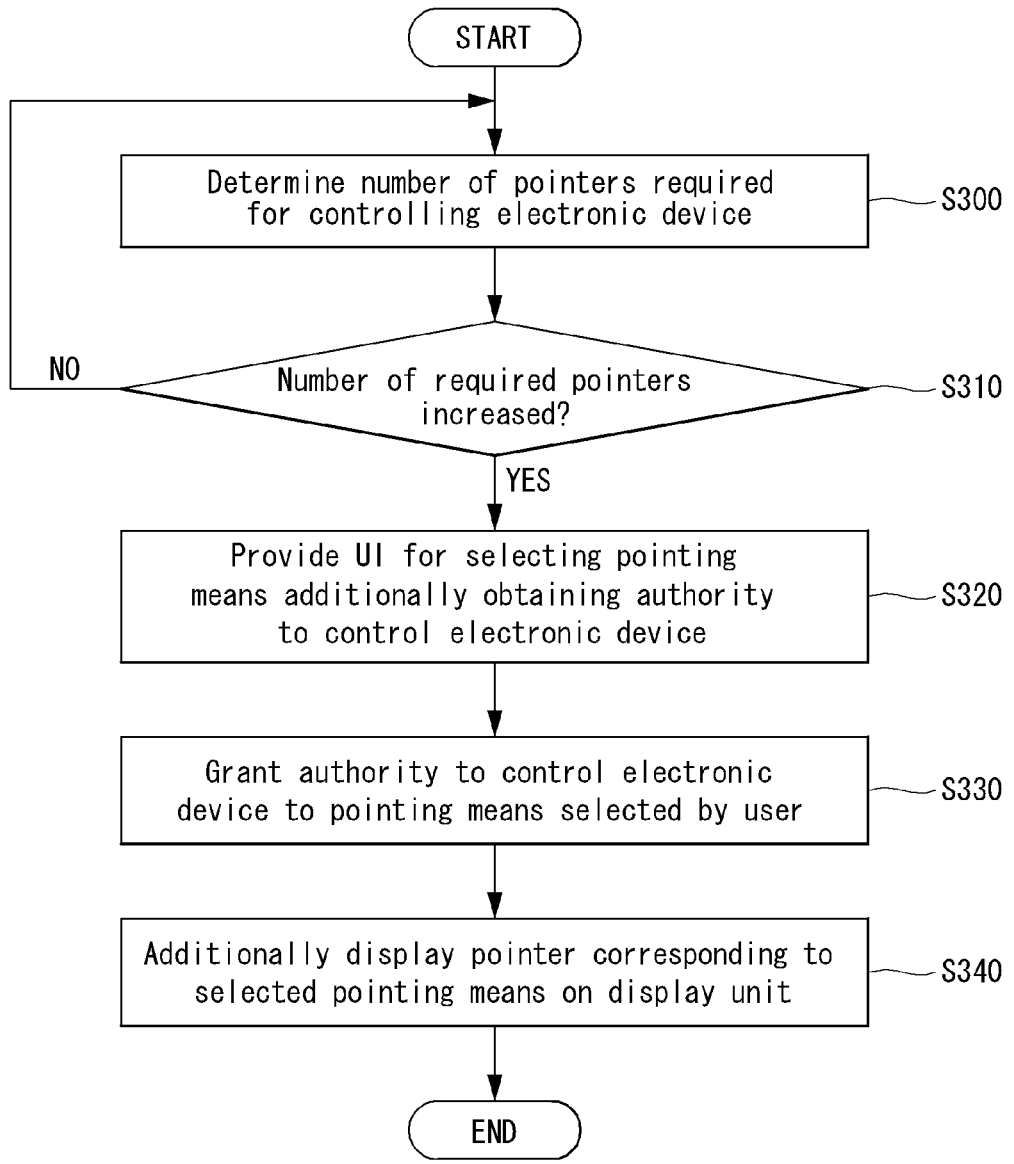
FIG. 8 is a flow chart illustrating the process of another example of a method for driving the electronic device according to an embodiment of the present invention.

With reference to FIG. 8, it is noted that the electronic device 100 is a TV, and pointing means such as a first remote controller 200, a second remote controller 210, both hands 301 and 302 of a first user 300, both hands 311 and 312 of a second user 310, or the like, are recognized by a sensing unit of the TV 100. Here, the first and second remote controllers 200 and 210 can be recognized by a particular wireless communication module included in the TV 100, and both hands 301 and 302 of the first user 300 and both hands 311 and 312 of the second user 310 may be recognized by the camera 121.

In FIG. 7, it is assumed that the predetermined priority levels are the first remote controller 200, the second remote controller 210, both hands 301 and 302 of the first user 300, and both hands 311 and 312 of the second user 310 in order. When the number of pointers required for controlling the TV 100 is 1, the controller 180 may grant the authority to control the TV 100 only to the first remote controller 200 or maintain the authority to control the TV 100 which has been granted to the first remote controller 200, and deprive the other pointing means, than the first remote controller 200, of the authority to control the TV 100. Here, only one pointer that follows a movement of the first remote controller 200 is displayed on the display unit 151 of the TV 100.

The predetermined priority levels of the pointing means in the TV 100 according to an embodiment of the present invention may differ according to an application executed in the TV 100. For example, when the application executed in the TV 100 is a two-player game requiring users' both hands, both hands 301 and 302 of the first user 300 and both hands 311 and 312 of the second user 310 may have higher levels than those of the first and second remote controllers 200 and 210.

FIG. 8 is a flow chart illustrating the process of another example of a method for driving the electronic device 100 according to an embodiment of the present invention. The driving method will now be described with reference to required drawings.

First, in a state in which a plurality of pointing means are recognized, the controller 180 of the electronic device 100 determines the number of pointers required for controlling the electronic device 100 (S300).

If the number of pointers required for controlling the electronic device 100 has been increased (S310), the controller 180 may display a user interface for selecting a pointing means for additionally obtaining the authority to control the electronic device 100, on the display unit 151 of the electronic device 100 (S320).

When the user selects a particular pointing means through the user interface displayed on the display unit 151, the controller 180 may grant the authority to control the electronic device 100 to the pointing means which has been selected by the user (S330) and additionally display a pointer corresponding to the selected pointing means on the display unit 151 (S340).

Figure 9:
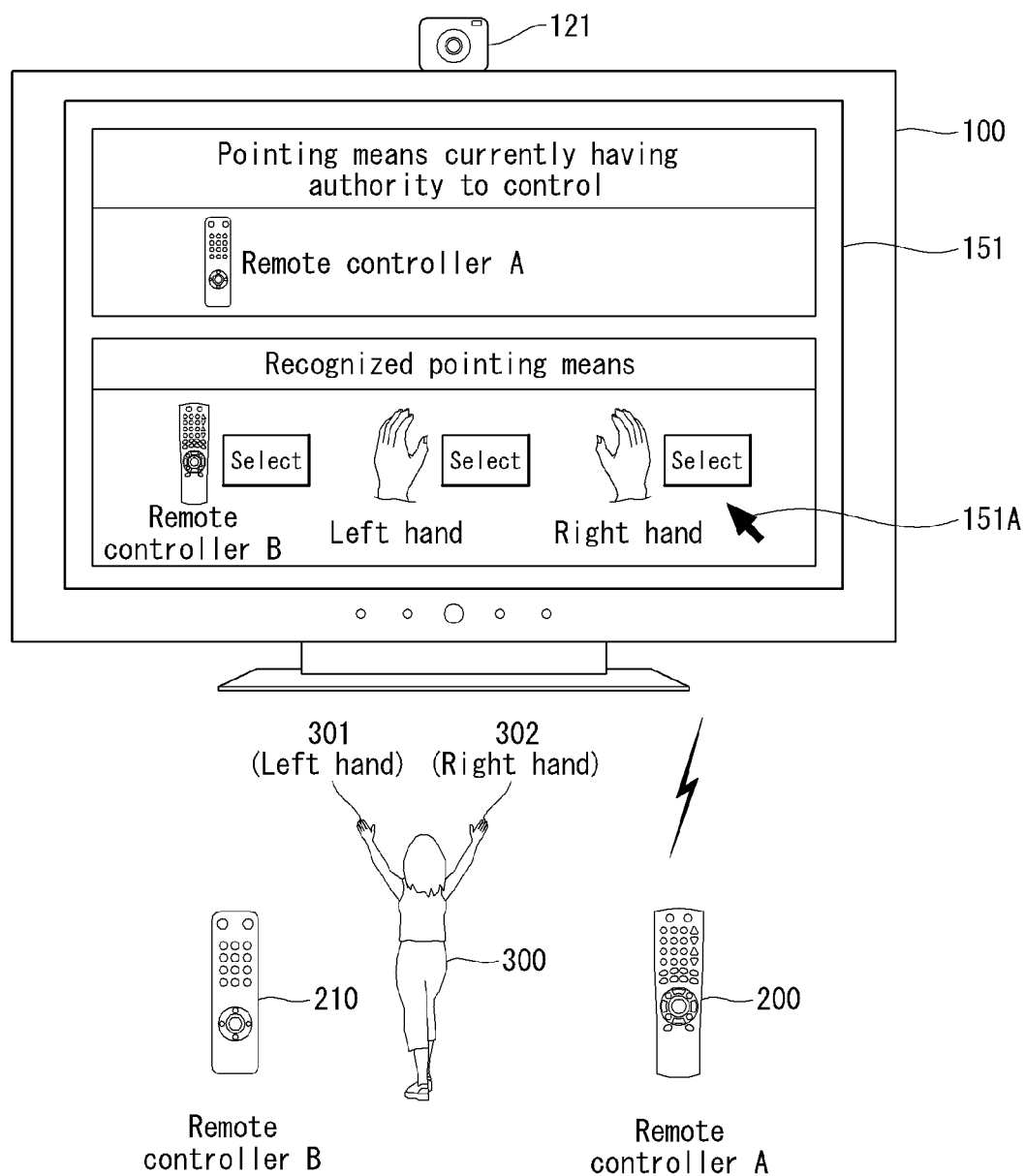
FIG. 9 is a view showing providing of a user interface for additionally selecting a pointing means to be granted the authority to control the electronic device according to the method for driving the electronic device illustrated in FIG. 8.

FIG. 9 is a view showing providing of a user interface for additionally selecting a pointing means to be granted the authority to control the electronic device 100 according to the method for driving the electronic device illustrated in FIG. 8.

With reference to FIG. 9, pointing means recognized by the electronic device 100 are the first remote controller 200, the second remote controller 210, and both hands 301 and 302 of the user 300, the authority to control the electronic device 100 is currently granted only to the first remote controller 200, and only a pointer corresponding to the first remote controller 200 is displayed on the display unit 151 of the electronic device 100. In the state illustrated in FIG. 9, it is noted that the user additionally selects a pointing means to have the authority to control the electronic device 100 by using the pointer 151A.

Figure 10:
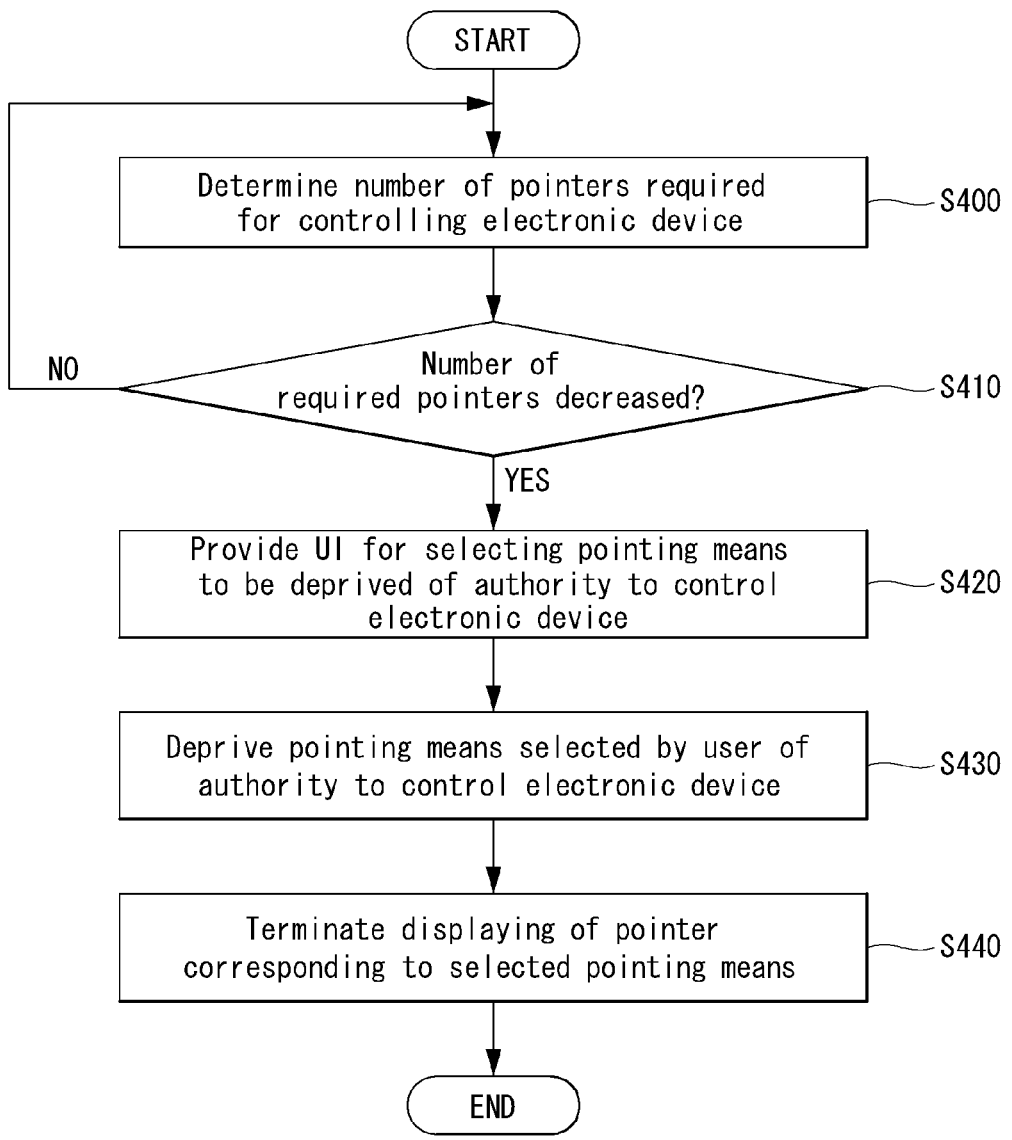
FIG. 10 is a flow chart illustrating the process of another example of a method for driving the electronic device according to an embodiment of the present invention.

FIG. 10 is a flow chart illustrating the process of another example of a method for driving the electronic device 100 according to an embodiment of the present invention. The driving method will now be described with reference to required drawings.

First, in a state in which a plurality of pointing means are recognized, the controller 180 of the electronic device 100 determines the number of pointers required for controlling the electronic device 100 based on obtained context awareness information (S400).

If the number of pointers required for controlling the electronic device 100 has been reduced (S410), the controller 180 may display a user interface for selecting a pointing means to be deprived of the authority to control the electronic device 100 on the display unit 151 of the electronic device 100 (S420).

When the user selects a particular pointing means through the user interface displayed on the display unit 151, the controller 180 deprives the pointing means selected by the user of the authority to control the electronic device 100 (S430) and terminates displaying of the pointer corresponding to the selected pointing means on the display unit 151 (S440).

Figure 11:
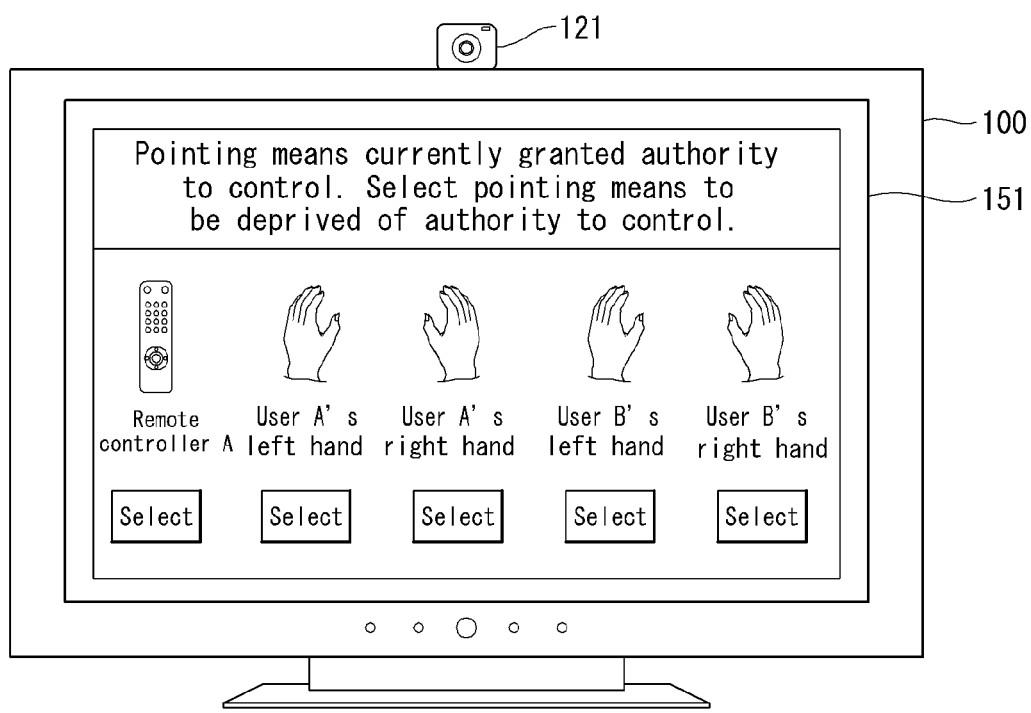
FIG. 11 is a view showing providing of a user interface for selecting a pointing means to be deprived the authority to control the electronic device according to the method for driving the electronic device illustrated in FIG. 10.

FIG. 11 is a view showing providing of a user interface for selecting a pointing means to be deprived the authority to control the electronic device according to the method for driving the electronic device 100 illustrated in FIG. 10.

With reference to FIG. 11, it is noted that pointing means recognized by the electronic device 100 include a remote controller, both hands of the first user, and both hands of the second user, and a pointing means to be deprived of the authority to control the electronic device 100 can be selected from among the recognized pointing means.

FIG. 12 is a view showing that the types of pointers displayed on a display unit of the electronic device can be different according to the types of pointing means in the electronic device 100 according to an embodiment of the present invention.

FIG. 12(*a*) shows a pointer having a shape of a general arrow displayed on the electronic device 100 according to an embodiment of the present invention. FIG. 12(*b*) shows a pointer having a shape of a person's left hand displayed on the display unit 151 when the pointing means is a user's left hand. FIG. 12(*c*) shows a pointer having a shape of a person's right hand displayed on the display unit 151 when the pointing means is a user's right hand. FIG. 12(*d*) shows a pointer having a shape of a remote controller displayed on the display unit 151. FIG. 12(*e*) is a pointer having a shape of a smartphone displayed on the display unit 151 when the pointing means is a smartphone.

As described with reference to FIG. 12, when the shape of the pointer displayed on the display unit 151 is changed according to types of pointing means, the pointing means granted the authority to control the electronic device 100 can be recognized by intuition.

Figure 13:
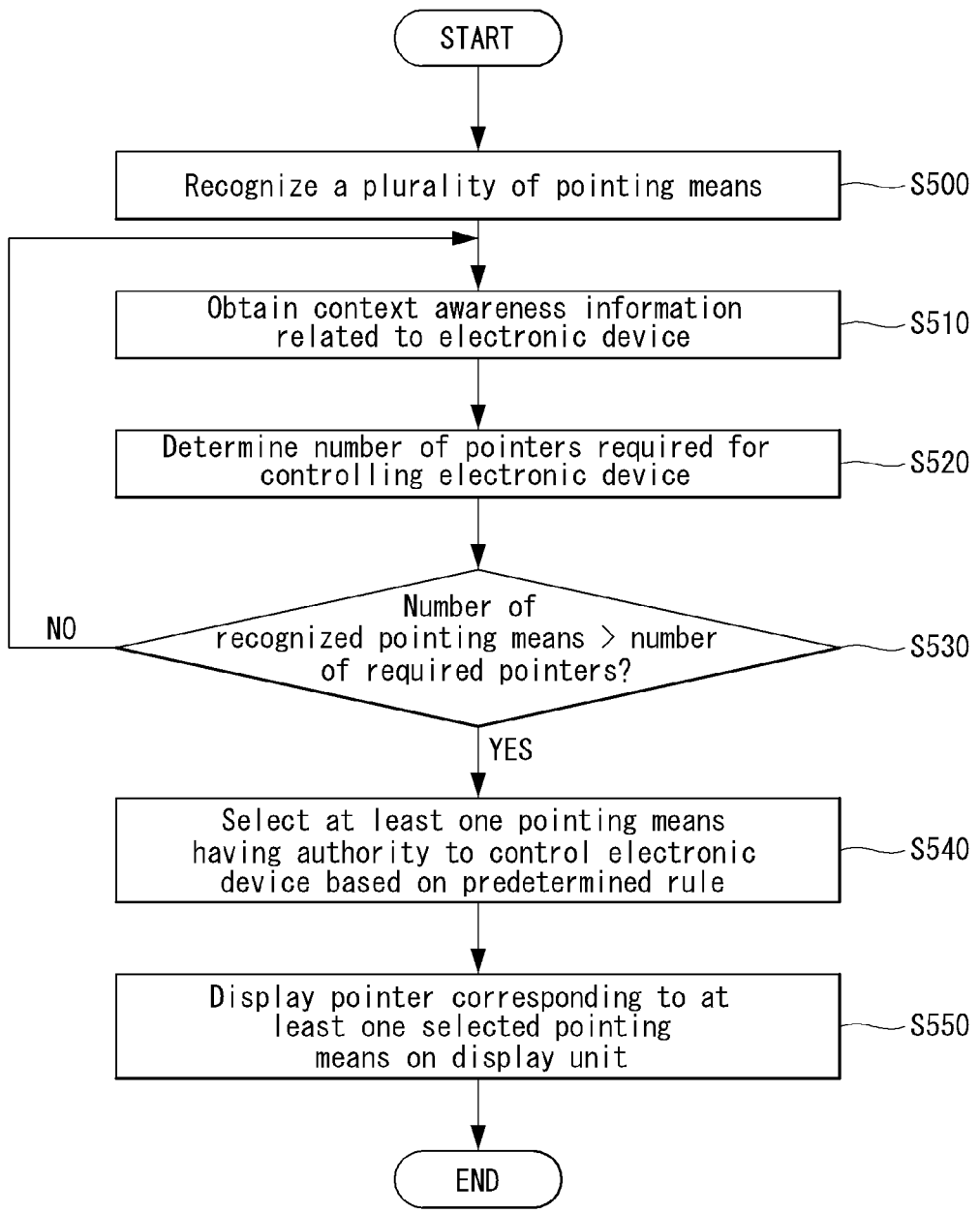
FIG. 13 is a flow chart illustrating the process of another example of a method for driving the electronic device according to an embodiment of the present invention.

FIG. 13 is a flow chart illustrating the process of another example of a method for driving the electronic device 100 according to an embodiment of the present invention. The method for driving the electronic device 100 will now be described with reference to required drawings.

First, the electronic device 100 recognizes a plurality of pointing means by using at least one sensing unit (S500), obtains context awareness information related to the electronic device 100 (S510), and determines the number of pointers required for controlling the electronic device 100 based on the obtained context awareness information (S520).

When the number of the recognized pointing means is greater than the number of pointers required for controlling the electronic device 100 (S530), the controller 180 of the electronic device 100 selects at least one pointing means having the authority to control the electronic device 100 based on a predetermined rule (S540) and displays a pointer corresponding to the at least one selected pointing means on the display unit 151 of the electronic device 100. Then, the user can control the electronic device 100 by using the pointer.

Here, the predetermined rule may be granting the authority to control the electronic device 100 to the pointing means as many as the required pointers according to order recognized by the at least one sensing unit. Also, the predetermined rule may be granting the authority to control the electronic device 100 to the pointing means as many as the required pointers according to predetermined priority levels.

The granting of the authority to control the electronic device 100 to pointing means has been described, and maintaining of the authority to control the electronic device 100, which has been already granted to pointing means or depriving of the authority to control the electronic device 100 may also follow the foregoing predetermined rule. Also, the predetermined rule may vary according to types of applications executed in the depriving of the authority to control the electronic device 100.

Figure 14:
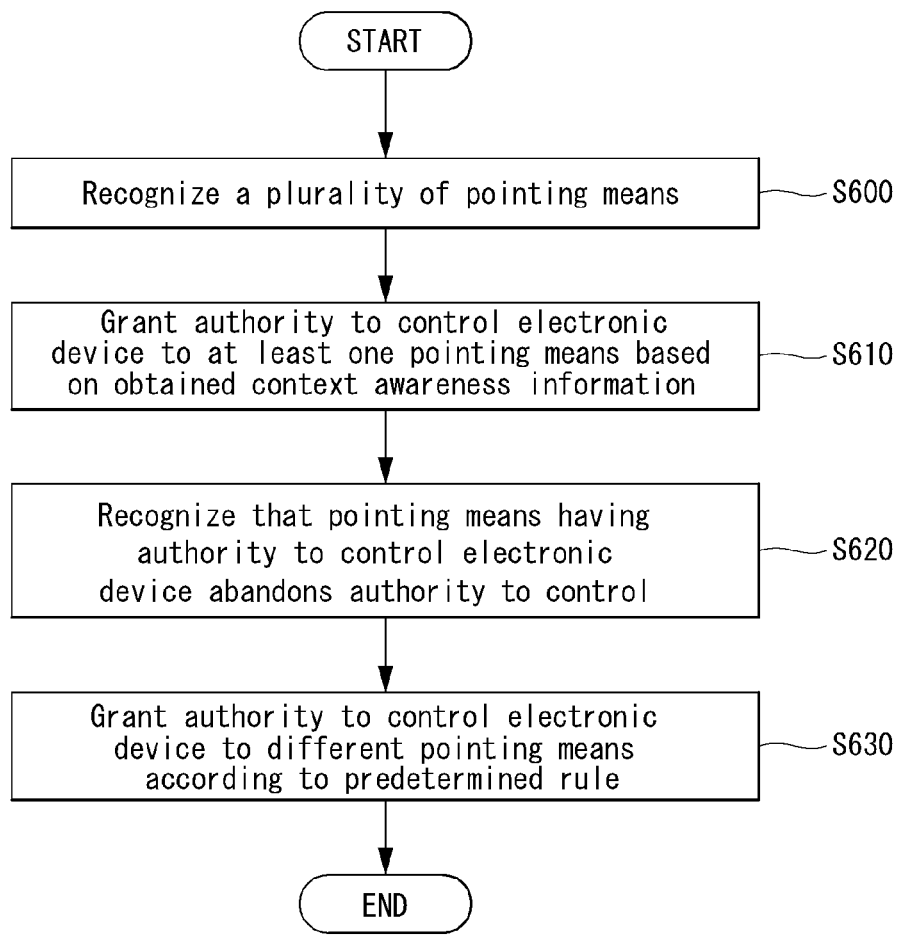
FIG. 14 is a flow chart illustrating the process of another example of a method for driving the electronic device according to an embodiment of the present invention.

FIG. 14 is a flow chart illustrating the process of another example of a method for driving the electronic device 100 according to an embodiment of the present invention. The method for driving the electronic device 100 will now be described with reference to required drawings.

First, a plurality of pointing means are recognized (S600), and then, the authority to control the electronic device 100 is granted to at least one of the plurality of pointing means (S610).

In this state, when it is recognized that the pointing means having the authority to control the electronic device 100 abandons the authority to control the electronic device 100 (S620), the controller 180 grants the authority to control the electronic device 100 to a different pointing means according to a predetermined rule (S630).

Here, the abandoning of the authority to control the electronic device 100 electronic device 100 by the pointing means may include recognizing of a user's gesture of abandoning the authority to control the electronic device 100 in a state in which a gesture user interface is activated, limiting of the authority to control the electronic device 100 of particular pointing means, and the like. Here, also, the different pointing means is pointing means which has been recognized by the electronic device 100 but has not been selected as pointing means having the authority to control the electronic device 100.

Figure 15:
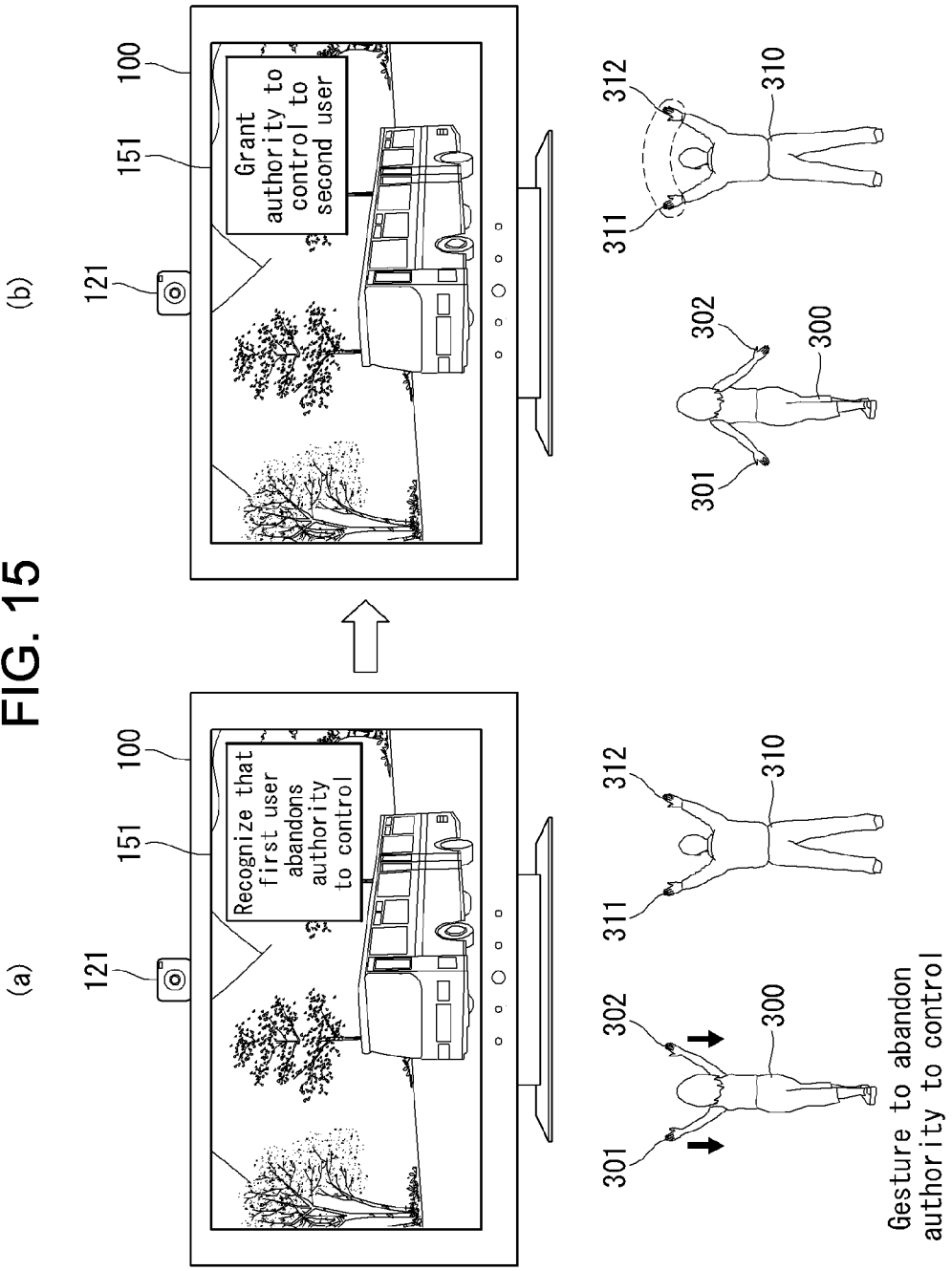
FIG. 15 is a view showing an example of activating a gesture user interface by a user who does not have the authority to control the electronic device according to the method for driving the electronic device illustrated in FIG. 14.

FIG. 15 is a view showing an example of activating a gesture user interface by the user 310 who does not have the authority to control the electronic device according to the method for driving the electronic device 100 illustrated in FIG. 14.

With reference to FIG. 15(*a*), when the first user 300 having the authority to control the electronic device 100 by using a gesture makes a gesture of putting both of his hands 301 and 302 down to abandon the authority to control, a message indicating that the first user 300 has abandoned the authority to control the electronic device 100 is displayed on the display unit 151.

With reference to FIG. 15(*b*), when abandoning of the authority to control the electronic device 100 by the first user 300 is recognized, a message indicating that the authority to control the electronic device 100 is granted to both of the hands of the second user 310 is displayed.

Figure 16:
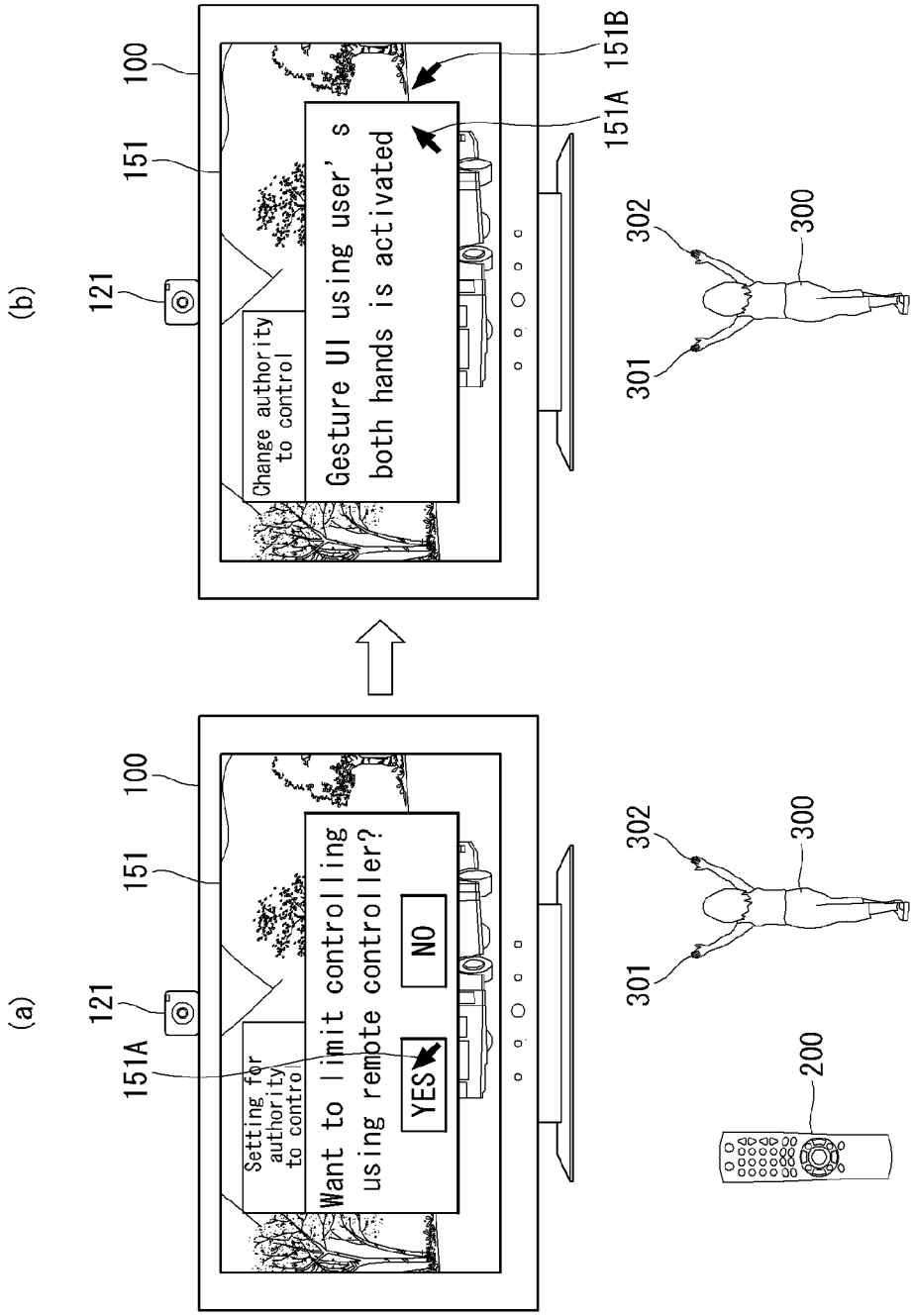
FIG. 16 is a view showing that a gesture user interface using the user's both hands is activated when the authority to control the electronic device by the remote controller having the authority to control the electronic device is limited according to the method for driving an electronic device illustrated in FIG. 14.

FIG. 16 is a view showing that a gesture user interface using the user's both hands is activated when the authority to control the electronic device 100 by the remote controller 200 having the authority to control the electronic device 100 is limited according to the method for driving an electronic device illustrated in FIG. 14.

With reference to FIG. 16(*a*), it is noted that a message for limiting controlling the electronic device 100 by the remote controller 200 is displayed on the display unit 151. The user selects an agreement button. Here, the pointer 151A displayed on the display unit 151 may correspond to the remote controller 200.

Then, as shown in FIG. 16(*b*), the controller 180 of the electronic device 100 limits the authority to control the electronic device 100 by the remote controller 200 and grants the authority to control the electronic device 100 to both hands 301 and 302 of the user 300, thereby activating the gesture user interface by the user 300. Here, in FIG. 16(*b*), the pointers 151A and 151B displayed on the display unit 151 may correspond to both hands 301 and 302 of the user 300.

Figure 17:
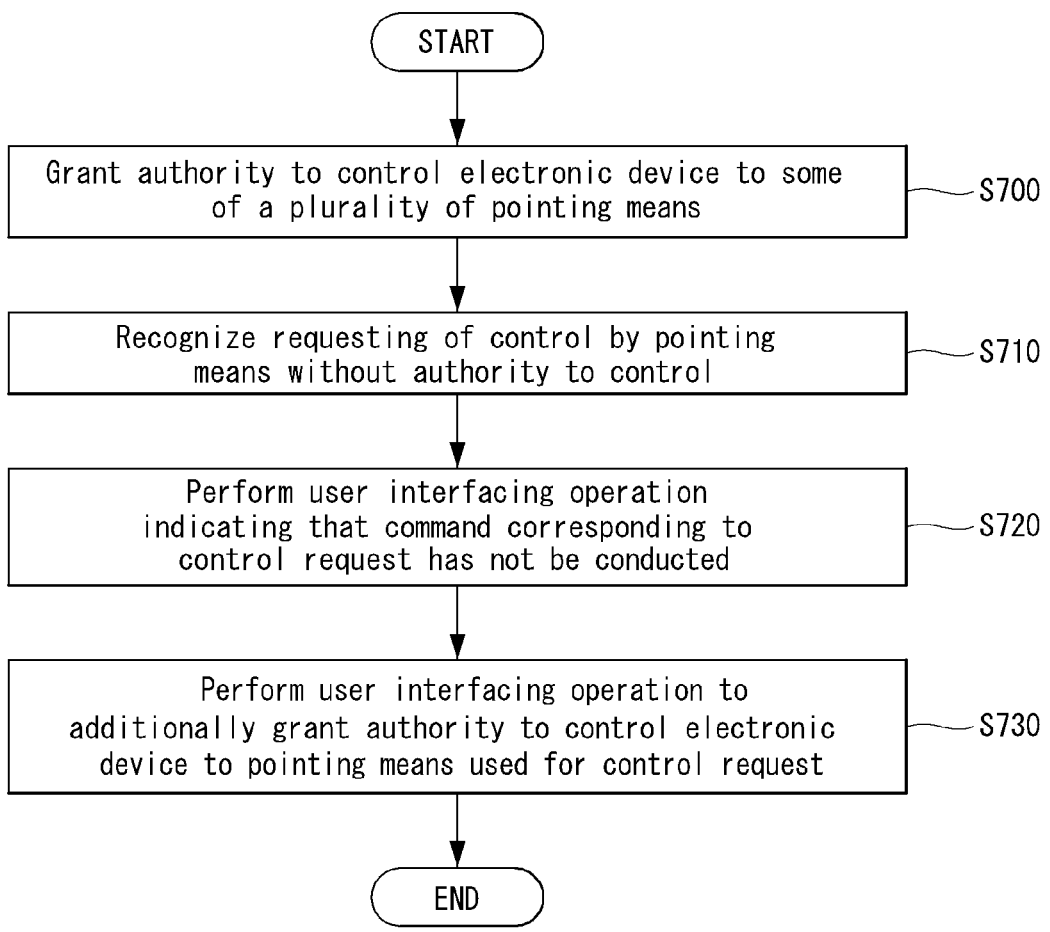
FIG. 17 is a flow chart illustrating the process of another example of a method for driving the electronic device according to an embodiment of the present invention.

FIG. 17 is a flow chart illustrating the process of another example of a method for driving the electronic device 100 according to an embodiment of the present invention. The method for driving the electronic device 100 will now be described with reference to required drawings.

First, a plurality of pointing means are recognized by the electronic device 100 (S600), and then, the authority to control the electronic device 100 is granted to some of the plurality of pointing means (S700). However, a control request is received from pointing means, to which the authority to control the electronic device 100 has not been granted, among the plurality of pointing means (S710). Here, the control request by the pointing means to which the authority to control the electronic device 100 has not been granted may include a control request based on a manipulation of the remote controller set such that its function is limited when a user, who does not have the authority to control the electronic device 100 including the gesture user interface function, makes a particular gesture, and the like.

Then, the controller 180 of the electronic device 180 performs a user interfacing operation indicating that a command corresponding to the control request is not conducted (S720) and then performs a user interfacing operation for additionally granting the authority to control the electronic device 100 to pointing means used for the control request (S730). Here, the user interfacing operation may include outputting a voice or image message, outputting an alarm sound, and the like. However, the scope of the present invention is not limited thereto.

Figure 18:
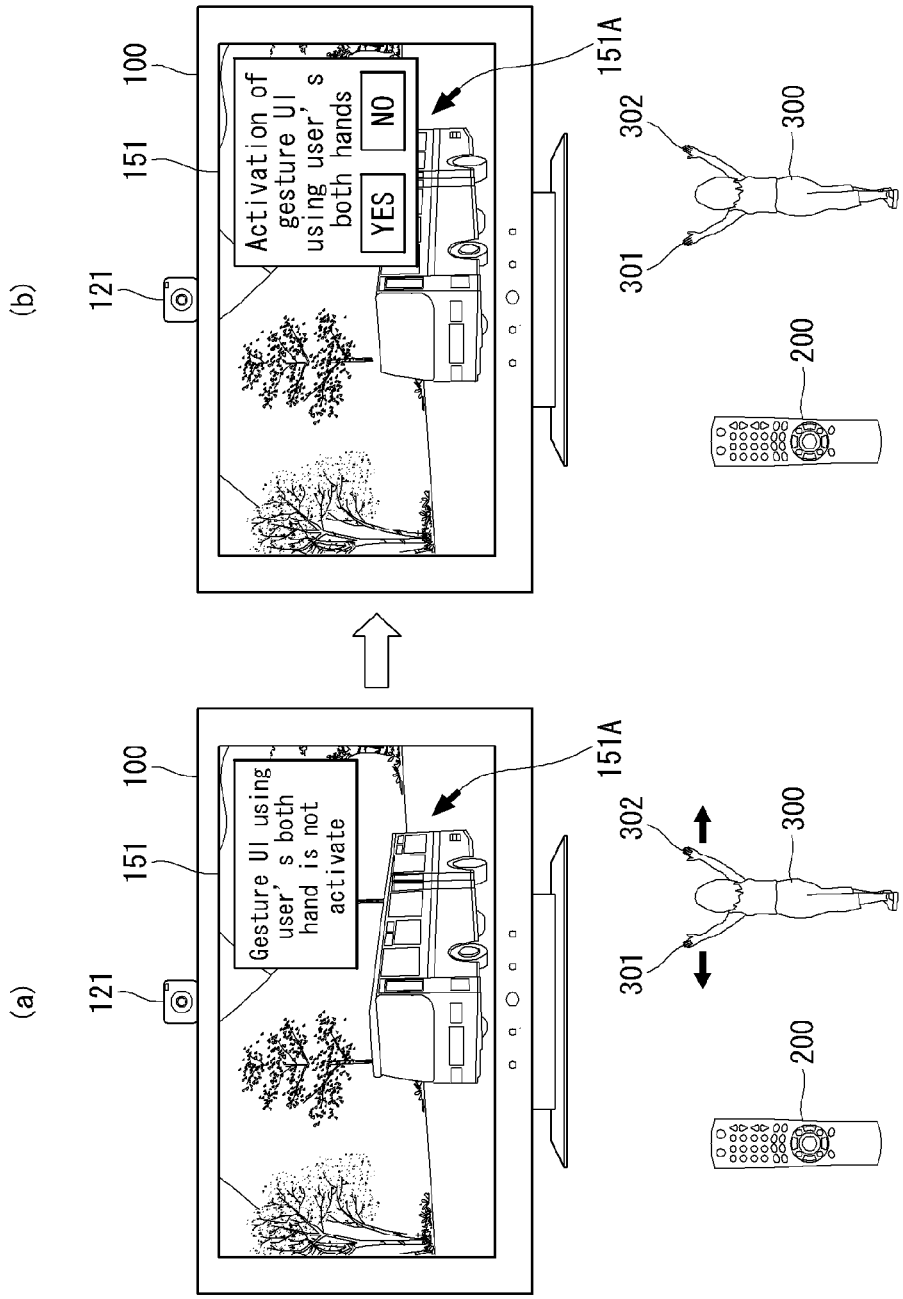
FIG. 18 is a view showing that a gesture user interface can be activated for the user who does not have the authority to control the electronic device according to the method for driving the electronic device illustrated in FIG. 17.

FIG. 18 is a view showing that a gesture user interface can be activated for the user 300 who does not have the authority to control the electronic device 100 according to the method for driving the electronic device 100 illustrated in FIG. 17.

In FIG. 18, the authority to control the electronic device 100 is granted only to the remote controller 200, but not to the user 300. With reference to FIG. 18(*a*), it is noted that when the user 300 makes a gesture of opening both hands 301 and 302 which corresponds to magnification of a screen, the controller 180 of the electronic device 100 displays a message indicating that the command for magnifying the screen according to the gesture cannot be performed on the display unit 151.

With reference to FIG. 18(*b*), it is noted that the controller 180 additionally grants the authority to control the electronic device 100 to both hands 301 and 302 of the user 300 to display a message for activating the gesture user interface by the user terminal 200 on the display unit 151.

Figure 19:
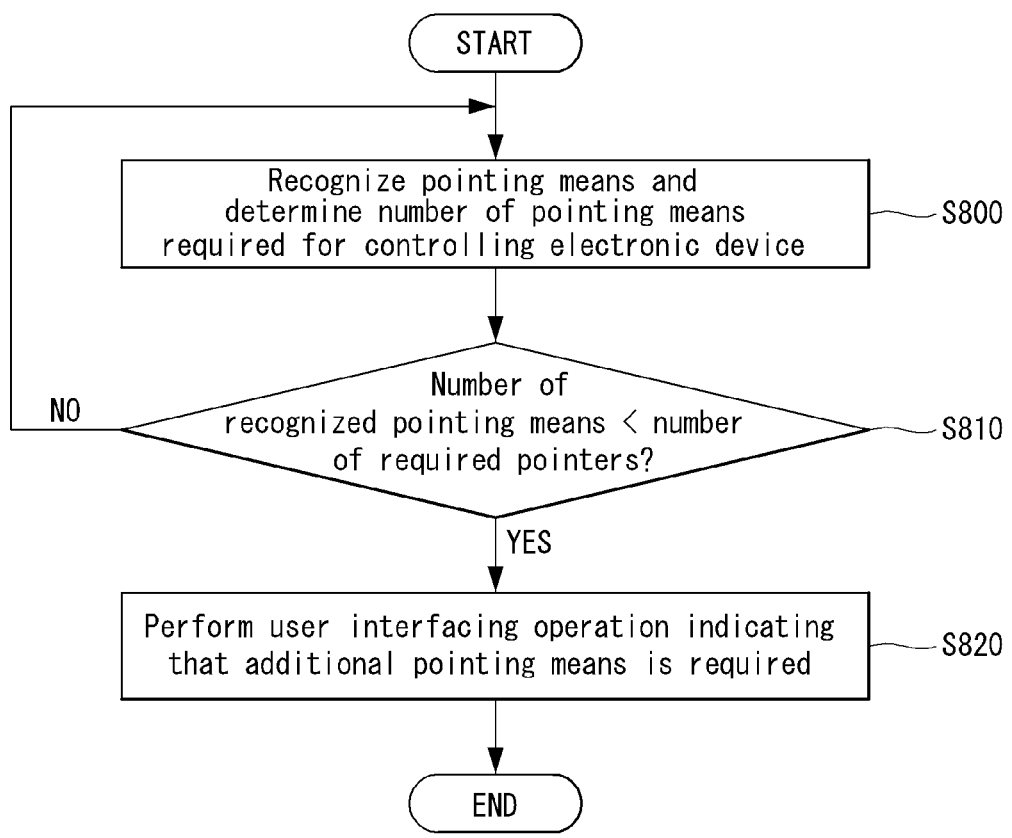
FIG. 19 is a flow chart illustrating the process of another example of a method for driving the electronic device according to an embodiment of the present invention.

FIG. 19 is a flow chart illustrating the process of another example of a method for driving the electronic device 100 according to an embodiment of the present invention. The method for driving the electronic device 100 will now be described with reference to required drawings.

First, the electronic device 100 recognizes pointing means around the electronic device 100 by using at least one sensing unit, and determines the number of pointing means required for controlling the electronic device 100 based on obtained context awareness information related to the electronic device 100 (S800).

If the number of the recognized pointing means is smaller than the number of pointers required for controlling the electronic device 100 (S810), the controller 180 of the electronic device 100 performs a user interfacing operation indicating that an additional pointing means is required (S820). Here, the user interfacing operation may include outputting a voice or image message, outputting an alarm sound, and the like. However, the scope of the present invention is not limited thereto.

Figure 20:
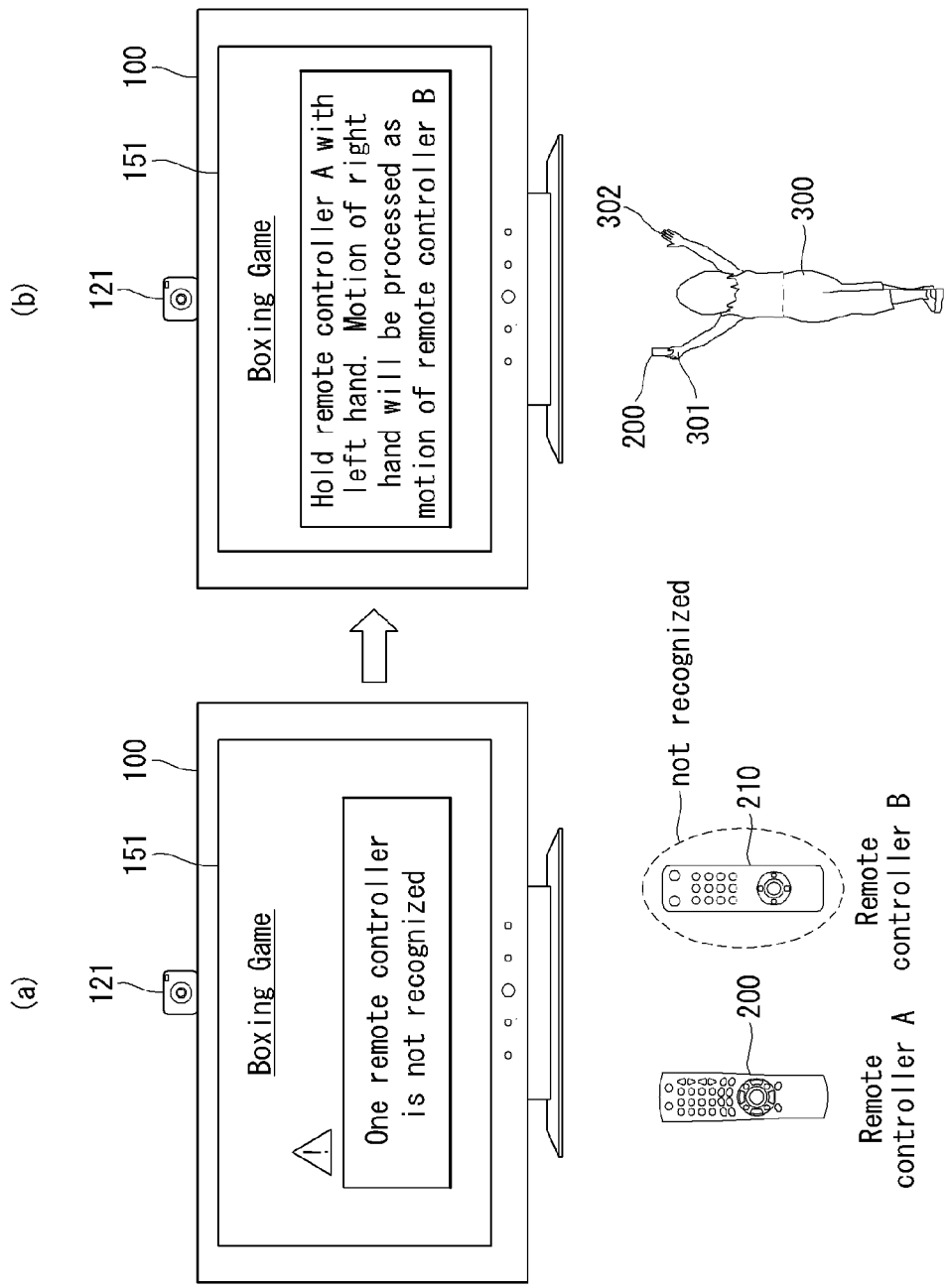
FIG. 20 is a view showing a process of granting the authority to control the electronic device to an additional pointing means according to the method for driving the electronic device illustrated in FIG. 19.

FIG. 20 is a view showing a process of granting the authority to control the electronic device 100 to an additional pointing means according to the method for driving the electronic device illustrated in FIG. 19.

With reference to FIG. 20(*a*), a boxing game using the gesture user interface using two remote controllers 200 and 210 is executed. Here, when only one remote controller 200 is recognized, the controller 180 of the electronic device 100 controls the display unit 151 to display an image message indicating that the other remaining remote controller 210 is not recognized.

Namely, the electronic device 100 according to an embodiment of the present invention performs the user interfacing operation in order to indicate that the other remaining remote controller 210 is additionally required according to the obtained context information. Although not shown in FIG. 20(*a*), the electronic device 100 may output a voice message indicating that the other remaining remote controller 210 is required.

With reference to FIG. 20(*b*), the controller 180 controls the display unit 151 to display an image message indicating that a movement of the other remaining unrecognized remote controller 210 is substituted by a motion of the hand not holding the recognized remote controller 200 based on the obtained context awareness information. Namely, when the predetermined pointing means is not recognized, the electronic device 100 according to an embodiment of the present invention may substitute the predetermined pointing means with other pointing means according to the obtained context awareness information.

FIG. 21 is a view showing that an image message is displayed on the display unit 151 in order to inform the user about a substitute control method with respect to the method for controlling the electronic device 100 using an unrecognized pointing means by using the currently recognized pointing means according to the method for driving the electronic device 100 illustrated in FIG. 19. Although not shown in FIG. 21, the controller 180 of the electronic device 100 may provide a voice message corresponding to the image message to the user. Also, the controller 180 may omit the user interfacing operation to inform the user about the foregoing substituting method and immediately activate the substation control method.

Figure 22:
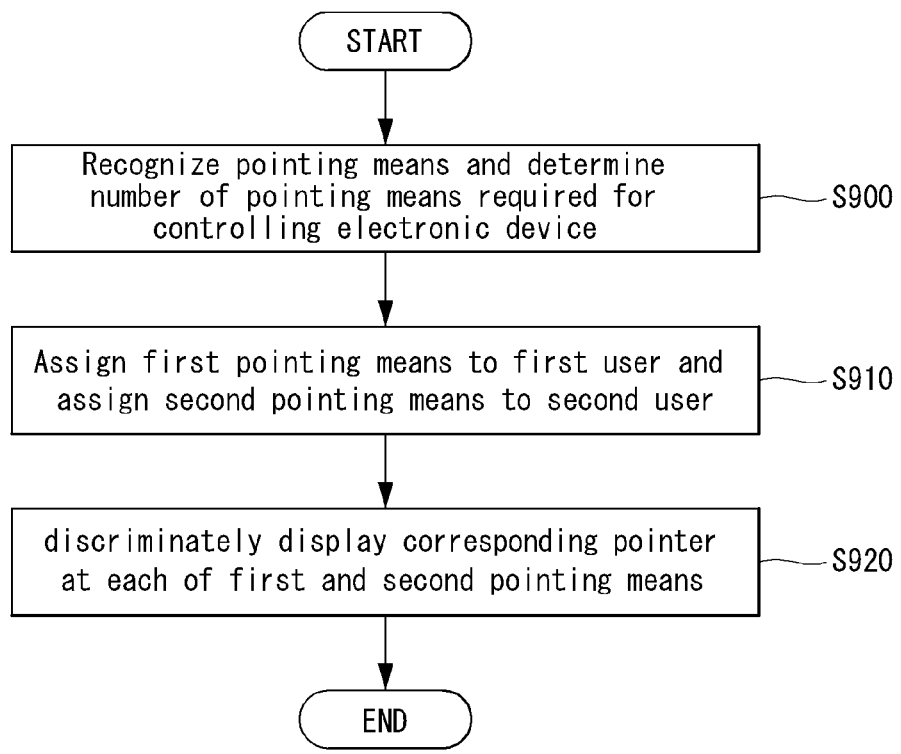
FIG. 22 is a flow chart illustrating the process of another example of a method for driving the electronic device according to an embodiment of the present invention.

FIG. 22 is a flow chart illustrating the process of another example of a method for driving the electronic device 100 according to an embodiment of the present invention. The method for driving the electronic device 100 will now be described with reference to required drawings.

First, the electronic device 100 recognizes pointing means around the electronic device 100 by using at least one sensing unit, and determines the number of pointing means required for controlling the electronic device 100 based on obtained context awareness information (S900).

Next, the controller of the electronic device 100 assigns first pointing means to the first user and second pointing means to the second user (S910). As mentioned above, the pointing means assigned to the user may be a body part of the user, a remote controller for controlling the electronic device 100 held (grasped) by the user, a smartphone executing a remote controller application with respect to the electronic device 100 by the user, or the like. However, the scope of the present invention is not limited thereto. Also, the pointing means assigned to the users have the authority to control the electronic device 100.

Pointers corresponding to the first and second pointing means assigned to the first and second users, respectively, are displayed on the display unit 151 of the electronic device 100 such that they are discriminated from each other (S920). Then, the first and second users can recognize the pointers corresponding to the pointing means assigned to the first and second users themselves by intuition. The method of discriminately displaying the pointers corresponding to the first and second pointing means may include a method of displaying the first and second pointers in different forms, colors, sizes, or the like, but the scope of the present invention is not limited thereto.

Figure 23:
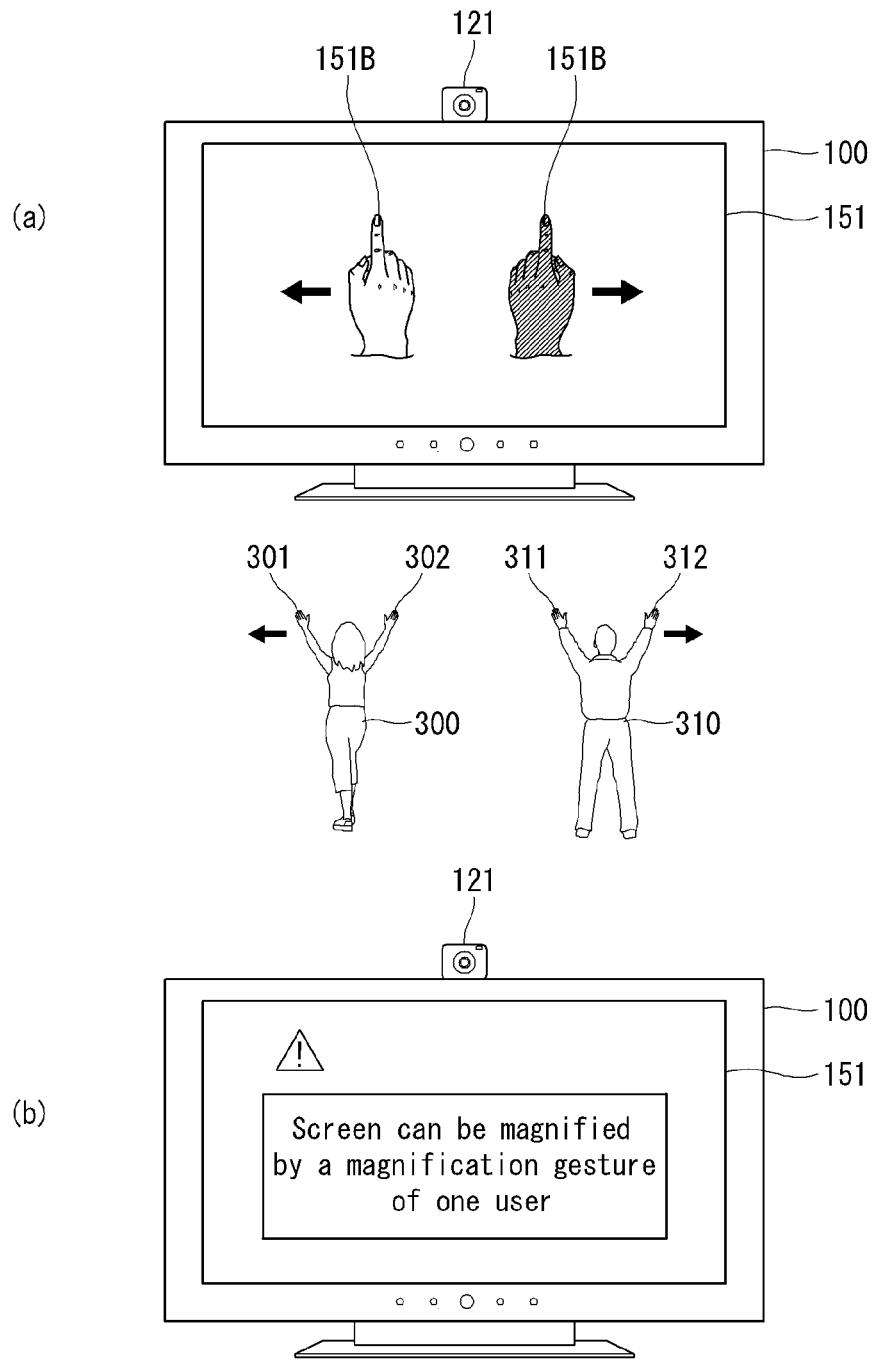
FIG. 23 is a view showing that, when gestures recognized by different users are gestures corresponding to a particular control request with respect to the electronic device according to an embodiment of the present invention, a message indicating that a command corresponding to the particular control request cannot be conducted is displayed on the display unit.

FIG. 23 is a view showing that, when gestures recognized by different users are gestures corresponding to a particular control request with respect to the electronic device 100 according to an embodiment of the present invention, a message indicating that a command corresponding to the particular control request cannot be conducted is displayed on the display unit 151.

In FIG. 23, it is assumed that the authority to control the electronic device 100 is granted to the right hand 302 of the first user 300 and the left hand 311 of the second user 310, and a gesture for magnifying the screen must be recognized by pointing means assigned to one user.

With reference to FIG. 23(*a*), the first point 151A corresponding to the right hand of the first user 300 and the second pointer 151B corresponding to the left hand 311 of the second user 310 are displayed on the display unit 151 of the electronic device 100, and it is noted that the colors of the pointers are different.

Also, in FIG. 23(*a*), the gestures of the first and second users 300 and 310 make a gesture to increase the distance between both hands, i.e., a gesture previously determined to magnify the screen. Then, as shown in FIG. 23(*b*), the controller 180 of the electronic device 100 outputs a message indicating that the screen magnification cannot be conducted by the gesture to the display unit 151.

Namely, when the gesture corresponding to a control request previously determined to be performed by a plurality of pointing means corresponding to one user is recognized by a plurality of pointing means assigned to different users, the electronic device 100 may perform a user interfacing operation to indicate that the command corresponding to the gesture is not conducted. Such a user interfacing operation may be outputting of an image message as shown in FIG. 23(*b*), outputting of a voice message, or outputting of an alarm sound.

Figure 24:
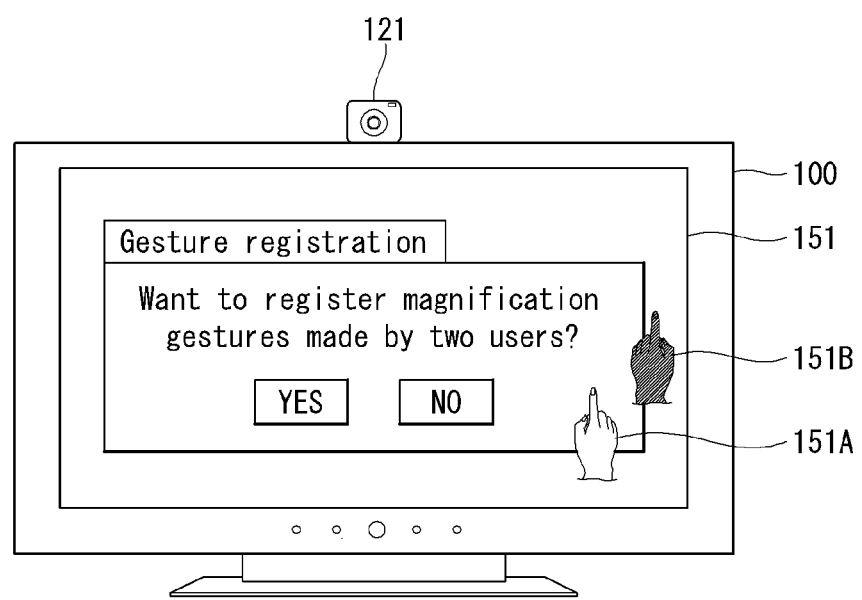
FIG. 24 is a view showing the results of performing a user interfacing operation to register a recognized gesture as a different gesture for performing the particular control function when the gesture, which is previously determined according to a request for performing a particular control function and is to be recognized by a plurality of pointing means assigned to a single user, is recognized by a plurality of pointing means assigned to different users, in the electronic device according to an embodiment of the present invention.

FIG. 24 is a view showing the results of performing a user interfacing operation to register a recognized gesture as a different gesture for performing the particular control function when the gesture, which is previously determined according to a request for performing a particular control function and is to be recognized by a plurality of pointing means assigned to a single user, is recognized by a plurality of pointing means assigned to different users, in the electronic device 100 according to an embodiment of the present invention.

With reference to FIG. 24, a message for registering the gesture made by the first and second users 300 and 310 in FIG. 23, as a new gesture for magnifying the screen, is displayed on the display unit 151. As discussed above, the controller 180 may inform the user that the gesture has been registered as a new gesture for magnifying the screen through a voice message output, a predetermined particular sound output, or the like, besides the message output through the display unit 151.

Unlike the case illustrated in FIG. 24, the controller 180 of the electronic device 100 may set the gesture made by the first and second users as a new gesture for magnifying a screen image without performing such a user interfacing process as shown in FIG. 24. Here, the controller 180 may perform a user interfacing operation indicating that the gesture has been set as a new gesture for magnification.

The respective driving methods of the electronic device 100 according to embodiments as described above may be implemented in the form of programs which can be executed by various computer means, and recorded on a computer-readable medium. The computer-readable medium may include program commands, data files, data structures, alone, or a combination thereof. Programs recorded on the medium may be particularly designed and structured for the present invention or available to those skilled in computer software.

Examples of the computer-readable recording medium include hardware devices, particularly configured to store and perform program commands, such as, magnetic media, such as a hard disk, a floppy disk, and a magnetic tape; optical media, such as a compact disk-read only memory (CD-ROM) and a digital versatile disc (DVD). magneto-optical media, such as floptical disks, a read-only memory (ROM), a random access memory (RAM), and a flash memory. Programs may include, for example, a high-level language code that can be executed by a computer using an interpreter, as well as a machine language code, made by a complier. The hardware devices may be configured to be operated by one or more software modules to implement the present invention, and vice versa.

The embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. An electronic device comprising:
   at least one sensing unit configured to recognize a plurality of different pointing means;
   a display unit configured to display a pointer following a movement of a pointing means having authority to control the electronic device among the plurality of pointing means; and
   a controller configured to:
   obtain context awareness information related to the electronic device, the context awareness information comprising a content being displayed according to execution of an application in the electronic device, wherein the context awareness information is changed according to the content;
   determine the number of pointers required for controlling the content, and
   automatically grant the authority to control the electronic device to the plurality of pointing means as many as the number of required pointers from among the plurality of pointing means based on a predetermined rule, each pointer corresponding to each of the plurality of pointing means being moved relatively,
   wherein the content is controlled by a combination of gestures by the plurality of different pointing means,
   wherein when the number of pointing means required for controlling the displayed content is increased according to a change of the obtained context awareness information, the controller controls the display unit to display a user interface for selecting a pointing means to be additionally provided for obtaining the authority to control the electronic device on a screen, and
   wherein when the number of pointing means required for controlling the displayed content is decreased according to a change of the obtained context awareness information, the controller controls the display unit to display a user interface for selecting a pointing means to be deprived of the authority to control the electronic device on the screen.

2. The electronic device of claim 1, wherein the controller determines the number of pointers required for controlling the electronic device, based on a type of the application being executed in the electronic device.

3. The electronic device of claim 1, wherein the controller determines the number of pointers required for controlling the electronic device, based on a type of a function of the application being executed in the electronic device.

4. The electronic device of claim 1, wherein the controller determines the number of pointers required for controlling the electronic device, based on a type content output from the electronic device.

5. The electronic device of claim 1, wherein the controller determines whether to grant the authority to control the electronic device to at least one pointing means, whether to maintain the authority to control the electronic device by the plurality of pointing means, and whether to deprive the plurality of pointing means of the authority to control the electronic device, according to the determined number of the pointers and predetermined priority levels.

6. The electronic device of claim 1, wherein the controller displays different types of pointers on the display unit according to the types of pointing means granted the authority to control the electronic device.

7. The electronic device of claim 1, wherein the controller selects at least one pointing means having the authority to control the electronic device among the plurality of pointing means, according to an order in which the plurality of pointing means are recognized by the at least one sensing unit.

8. The electronic device of claim 1, wherein the controller selects at least one pointing means having the authority to control the electronic device among the plurality of pointing means, according to predetermined priority levels.

9. The electronic device of claim 8, wherein the predetermined priority levels are different according to a type of the application being executed in the electronic device.

10. The electronic device of claim 1, wherein when the authority to control the electronic device to at least one pointing means is abandoned, the controller grants the authority to control the electronic device to a different pointing means among the plurality of pointing means according to the predetermined rule.

11. The electronic device of claim 1, wherein when a request for controlling the electronic device from a pointing means that does not have the authority to control the electronic device among the plurality of pointing means is recognized, the controller performs a user interfacing operation indicating that a command corresponding to the request is not conducted.

12. The electronic device of claim 11, wherein the controller performs a user interfacing operation to additionally grant the authority to control the electronic device to the pointing means that does not have the authority to control among the plurality of pointing means.

13. The electronic device of claim 1,
   wherein the plurality of pointing means comprises at least one predetermined pointing means and at least one additional pointing means,
   wherein the at least one predetermined pointing means has the authority to control the electronic device, and the at least one additional pointing means does not have the authority to control the electronic device, and
   wherein the controller is further configured to, when the at least one predetermined pointing means is not recognized, and the number of the at least one predetermined pointing means recognized by the at least one sensing unit is smaller than the number of required pointers, substitute the predetermined pointing means with an additional pointing means such that the additional pointing means has the authority to control the electronic device.

14. The electronic device of claim 13, wherein the controller performs a user interfacing operation indicating that an additional predetermined pointing means required for controlling the electronic device is required, based on the obtained context awareness information.

15. The electronic device of claim 13, wherein the controller performs a user interfacing operation indicating that the predetermined pointing means is substituted with the additional pointing means.

16. The electronic device of claim 13, wherein the controller performs a user interfacing method that provides a control method for controlling the electronic device using the additional pointing means.

* * * * *